United States Patent
Snyder et al.

(10) Patent No.: US 7,137,243 B2
(45) Date of Patent: Nov. 21, 2006

(54) CONSTANT VOLUME COMBUSTOR

(75) Inventors: Philip H. Snyder, Avon, IN (US); Calvin W. Emmerson, Martinsville, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 38 days.

(21) Appl. No.: 10/613,290

(22) Filed: Jul. 3, 2003

(65) Prior Publication Data

US 2004/0154304 A1  Aug. 12, 2004

Related U.S. Application Data

(60) Provisional application No. 60/393,727, filed on Jul. 3, 2002.

(51) Int. Cl.
  *F02K 5/02* (2006.01)
  *F02K 7/00* (2006.01)

(52) U.S. Cl. ............ 60/247; 60/39.38; 60/772

(58) Field of Classification Search .......... 60/247, 60/210, 39.34, 39.76, 750, 39.38, 772
  See application file for complete search history.

(56) References Cited

U.S. PATENT DOCUMENTS

| | | | |
|---|---|---|---|
| 2,970,745 A * | 2/1961 | Berchtold | ............ 417/64 |
| 3,811,796 A | 5/1974 | Coleman, Jr. et al. | |
| 3,958,899 A | 5/1976 | Coleman, Jr. et al. | |
| 4,167,295 A | 9/1979 | Glaser | |
| 4,324,440 A | 4/1982 | Steigenberger et al. | |
| 5,267,432 A | 12/1993 | Paxson | |
| 5,297,384 A | 3/1994 | Paxson | |
| 5,894,719 A * | 4/1999 | Nalim et al. | ............ 60/782 |
| 5,916,125 A | 6/1999 | Snyder | |
| 6,138,456 A | 10/2000 | Garris | |
| 6,255,752 B1 | 7/2001 | Werner | |
| 6,351,934 B1 | 3/2002 | Snyder | |
| 6,434,943 B1 | 8/2002 | Garris | |
| 6,449,939 B1 | 9/2002 | Snyder | |
| 6,451,132 B1 | 9/2002 | Walmer et al. | |
| 6,457,311 B1 | 10/2002 | Fledersbacher et al. | |
| 6,460,342 B1 * | 10/2002 | Nalim | ............ 60/772 |
| 6,526,936 B1 | 3/2003 | Nalim | |
| 6,845,620 B1 * | 1/2005 | Nalim | ............ 60/776 |
| 2001/0015058 A1 | 8/2001 | Snyder | |
| 2002/0068250 A1 | 6/2002 | Nalim | |
| 2003/0029162 A1 | 2/2003 | Baker | |
| 2004/0216464 A1* | 11/2004 | Lupkes | ............ 60/776 |

* cited by examiner

*Primary Examiner*—William H. Rodriguez
(74) *Attorney, Agent, or Firm*—Krieg DeVault LLP

(57) ABSTRACT

A pressure wave apparatus utilizing the principles of pulsed detonation and wave rotor technologies. The apparatus includes inlet and outlet ports that interface with a plurality of fluid flow passageways on a rotor. A buffer gas is routed through some of the inlet and outlet ports and into and out of the plurality of fluid flow passageways. One of the inlet ports is a buffer gas inlet port that when placed in registry with a fluid flow passageway allows the flow of buffer gas into the respective passageway. Fuel is delivered into the buffer gas proximate the buffer gas inlet port so that only a portion of the buffer gas inlet port receives any fuel.

12 Claims, 21 Drawing Sheets

○ DETONATION INITIATOR
——— SHOCK WAVE
——— DETONATION WAVE
........... EXPANSION WAVE
— — — GAS INTERFACE

- ○ DETONATION INITIATOR
- ——— SHOCK WAVE
- ——— DETONATION WAVE
- ·········· EXPANSION WAVE
- – – – GAS INTERFACE o  DETONATION INITIATOR
— SHOCK WAVE
— DETONATION WAVE
······· EXPANSION WAVE
– – – GAS INTERFACE

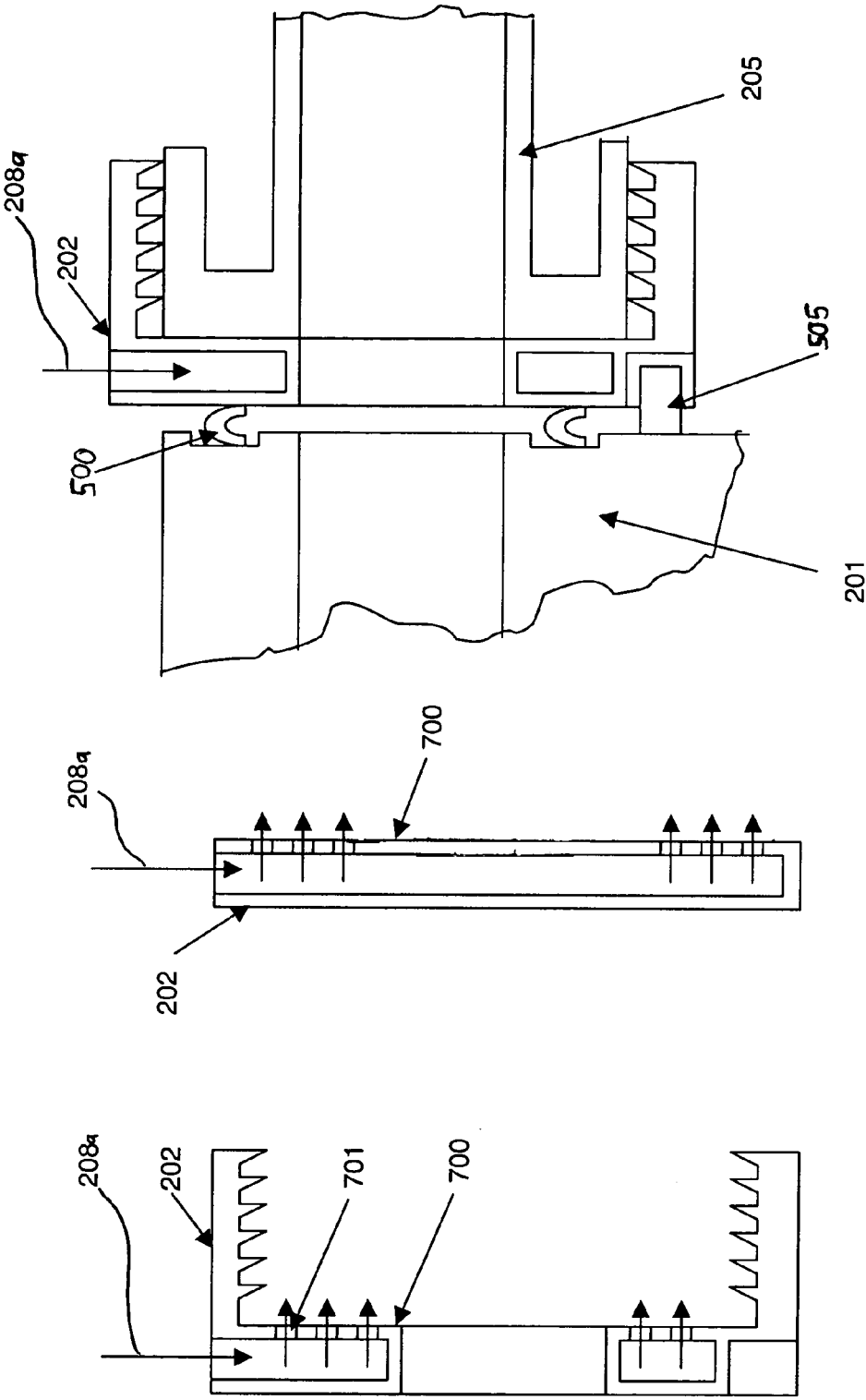

CONSTANT VOLUME COMBUSTOR

CROSS REFERENCE TO RELATED APPLICATIONS

The present application claims the benefit of U.S. Provisional Application No. 60/393,727 filed Jul. 3, 2002, and incorporated herein by reference.

The present application was made under contract MDA972-01-2-0014 by DARPA, and DARPA may have certain rights herein.

BACKGROUND OF THE INVENTION

The present invention relates generally to a constant volume combustion device including detonative combustion. More specifically, one form of the present invention is a combustion unit having a high pressure rise, a near time-steady inflow and outflow, while being self cooled. The constant volume combustor has properties of pulse detonation and wave rotor technologies. Although the present invention was developed for use as a combustor within a gas turbine engine, certain applications may be outside of this field.

One of the next big challenges in the area of commercial and military flight is the improvement in fuel economy as flight speeds increase well into the supersonic range. In order to address fuel consumption goals there will be continued engineering advancements in compressor and turbine aerodynamics, higher temperature materials, improved cooling schemes, and the utilization of lightweight materials. It is recognized that the engineering and scientific community should continue to develop greater efficiency for engine components, however more revolutionary change may be required to meet the anticipated future demands for gas turbine engines.

The present application is directed to more revolutionary change through a combustion apparatus utilizing pulsed detonation and wave rotor technologies. Since the 1940's wave rotors have been studied by engineers and scientists and thought of as particularly suitable for a propulsion system. A wave rotor is generally thought of as a generic term and describes a class of machines utilizing transient internal fluid flow to efficiently accomplish a desired flow process. Wave rotors depend on wave phenomena as the basis of their operation, and these wave phenomena have the potential to be exploited in novel propulsion systems, which include benefits such as higher specific power and lower specific fuel consumption. Pulse detonation engines have been researched as a replacement for rockets and as an alternative propulsion system in gas turbine engines. However, a significant drawback with pulse detonation has been the unsteady flow produced due to the sequencing of detonations to produce thrust or combustion. This unsteady flow is envisioned to result in a multiplicity of mechanical and aerodynamic based challenges.

There are a variety of wave rotor devices that have been conceived of over the years. However, until the present invention the potential for wave rotor and pule detonation technologies has not been realized. The present invention harnesses the potential of wave rotor and pulse detonation technology in a novel and unobvious way.

SUMMARY OF THE INVENTION

One form of the present invention contemplates a pressure wave apparatus, comprising: a rotatable rotor having a plurality of passageways therethrough, the rotor having a direction of rotation; a pair of exit ports disposed in fluid communication with the rotor and adapted to receive fluid exiting from the plurality of passageways, one of the pair of exit ports is a combusted gas exit port for passing a substantially combusted gas from the plurality of passageways and the other of the pair of exit ports is a buffer gas exit port for passing a buffer gas from the plurality of passageways; a pair of inlet ports disposed in fluid communication with the rotor and adapted to introduce fluid to the plurality of passageways, one of the pair of inlet ports is a working fluid inlet port for passing a working fluid into the plurality of passageways and the other of the pair of inlet ports is a buffer gas inlet port for receiving the buffer gas from the buffer gas exit port and passing the buffer gas into the plurality of passageways, the buffer gas exit port is adjacent to and sequentially prior to the buffer gas inlet port; and, a fuel deliverer adapted to deliver a fuel within the buffer gas exit port adjacent the rotatable rotor, wherein the fuel deliverer delivers fuel into a first portion of the buffer gas exit port and not into a second portion of the buffer gas exit port.

Another form of the present invention contemplates a method, comprising: rotating a wave rotor having a passageway with a first end and a second end; introducing a quantity of working fluid into the passageway through the first end of the passageway; delivering a quantity of fuel into the passageway through the first end of the passageway; burning the fuel within the passageway and creating a combusted gas; compressing a portion of the working fluid within the passageway to define a buffer gas; discharging a first portion of the buffer gas from the passageway through the first end of the passageway; discharging a portion of the combusted gas from the passageway through the second end of the passageway; parking a second portion of the buffer gas within the passageway proximate the first end; and, routing the first portion of the buffer gas from the discharging back into the passageway through the first end of the passageway.

Yet another form of the present invention contemplates a method for starting a gas turbine engine. The method, comprising: providing an engine including a compressor, a combustor including a wave rotor having a plurality of passageways and a turbine; rotating the wave rotor within the combustor; fueling at least a portion of the plurality of passageways; combusting the fuel within the plurality of passageways to form a flow of exhaust gas; discharging at least a portion of the exhaust gas from the wave rotor and delivering to a bladed rotor within the turbine; rotating the bladed rotor within the turbine with the exhaust gas from the discharging; and, the above acts to bring the compressor and turbine up to an operating condition.

Yet another form of the present invention contemplates an apparatus, comprising: a compressor for increasing the pressure of a working fluid passing therethrough, the compressor having a compressor discharge; a constant volume combustor in fluid communication with the compressor discharge, the constant volume combustor including a rotatable wave rotor and a fuel deliverer, the wave rotor including a plurality of cells for receiving at least a portion of the working fluid from the compressor discharge and a fuel from the fuel deliverer that undergoes combustion within the cells to produce an exhaust gas flow; a turbine in fluid communication with the exhaust flow from the constant volume combustor; and an active electromagnetic bearing operable to support the wave rotor.

One object of the present invention is to provide a unique constant volume combustor.

Related objects and advantages of the present invention will be apparent from the following description.

BRIEF DESCRIPTION OF THE DRAWINGS

FIG. 18a is an illustrative view of a seal comprising a portion of one form of the present invention.

FIG. 18b is an illustrative sectional view of a seal comprising a portion of one form of the present invention.

FIG. 18c is an illustrative sectional view of a seal comprising a portion of one form of the present invention.

DESCRIPTION OF THE PREFERRED EMBODIMENTS

Figure 1:
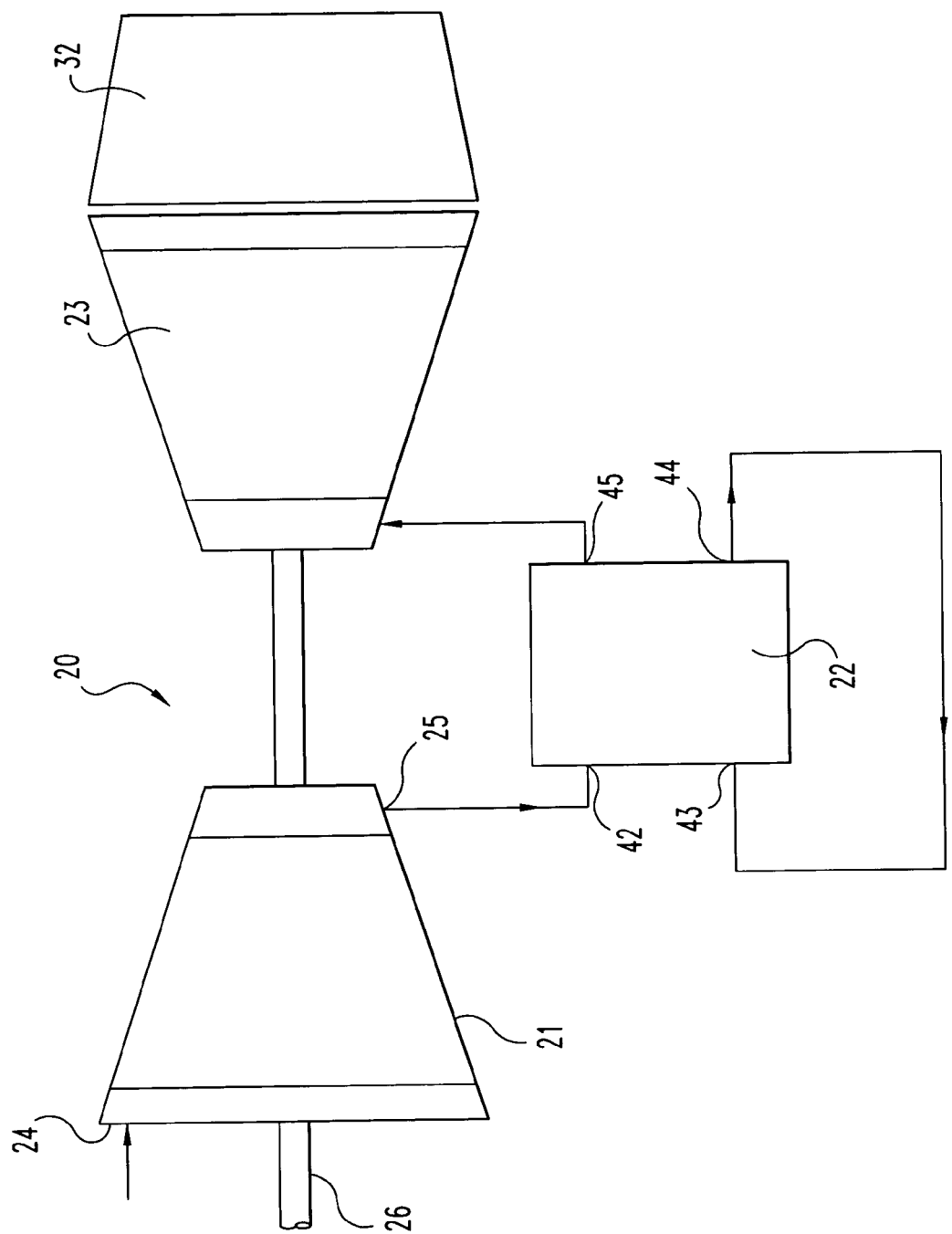
FIG. 1 is a schematic representation of a propulsion system comprising a compressor, a pulsed combustion engine wave rotor, a turbine, a nozzle and an output power shaft.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, there is illustrated a schematic representation of a propulsion system 20 which includes a compressor 21, a pulsed combustion wave rotor 22, a turbine 23, a nozzle 32, and an output power shaft 26. The compressor 21 delivers a precompressed working fluid to the pulsed combustion wave rotor device 22. Wave rotor device 22 has occurring within its passageways the combustion of a fuel and air mixture, and thereafter the combusted gases are delivered to the turbine 23. The working fluid that is precompressed by the compressor 21 and delivered to the wave rotor device 22 is selected from a group including oxygen, nitrogen, carbon dioxide, helium or a mixture thereof, and more preferably is air. In one embodiment the pulsed combustion wave rotor device 22 replaces the compressor diffuser and combustor of a conventional gas turbine engine. The present invention contemplates both a pulsed detonation combustion process and a pulsed deflagration combustion process. While the present invention will generally be described in terms of a pulsed detonation combustion process, it also contemplates a pulsed deflagration combustion process.

In one embodiment the components of the propulsion system 20 have been integrated together to produce an aircraft flight propulsion engine capable of producing either shaft power or direct thrust or both. The term aircraft is generic and includes helicopters, airplanes, missiles, unmanned space devices and other substantially similar devices. It is important to realize that there are multitudes of ways in which the propulsion engine components can be linked together. Additional compressors and turbines could be added with inter-coolers connected between the compressors and reheat combustion chambers could be added between the turbines. The propulsion system of the present invention is suited to be used for industrial applications, such as but not limited to pumping sets for gas or oil transmission lines, electricity generation and naval propulsion. Further, the propulsion system of the present invention is also suitable to be used for ground vehicular propulsion requiring the use of shaft power such as automobiles and trucks.

Figure 2:
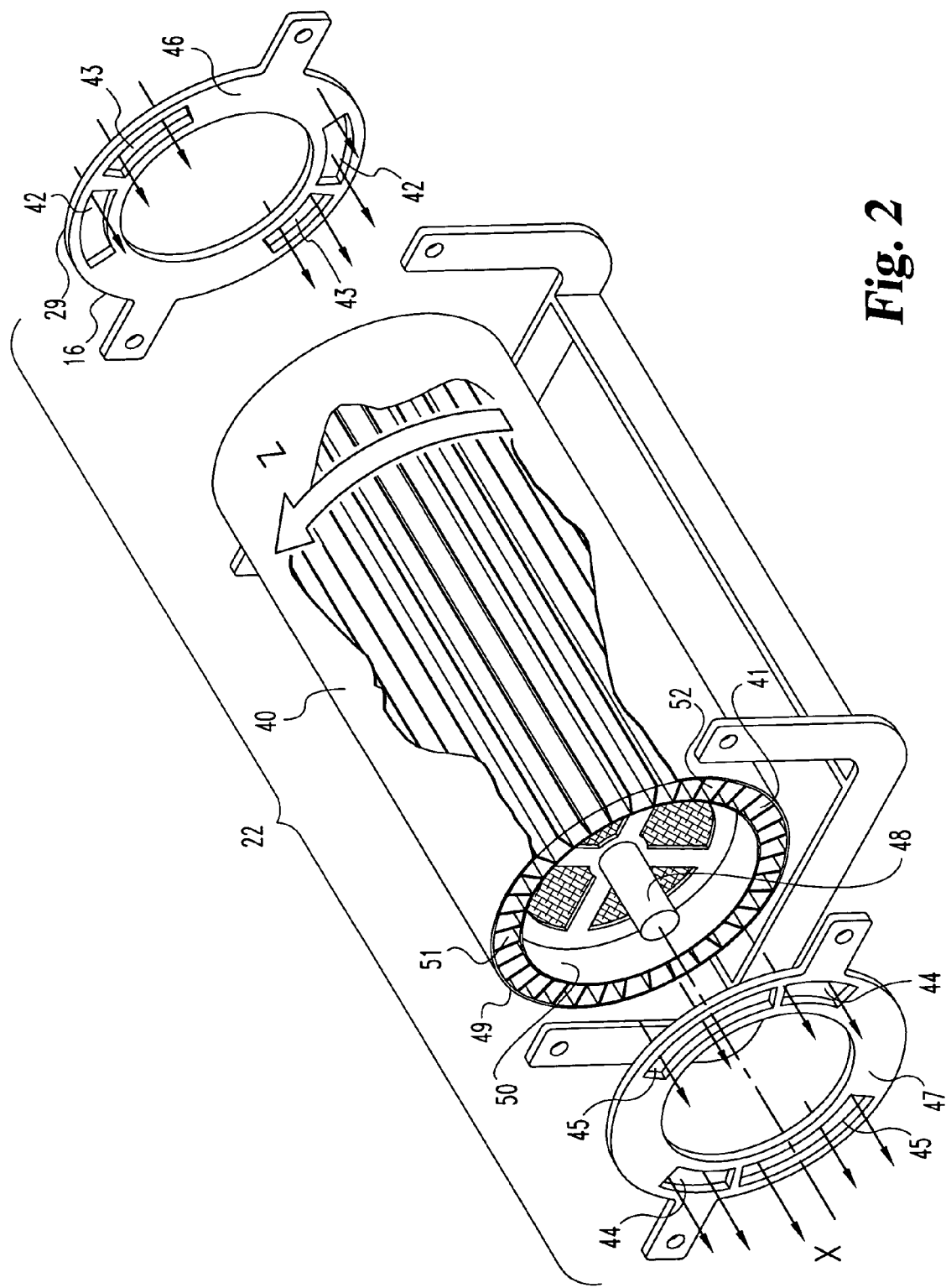
FIG. 2 is a partially exploded view of one embodiment of a pulsed combustion engine wave rotor comprising a portion of FIG. 1.
Figure 3:
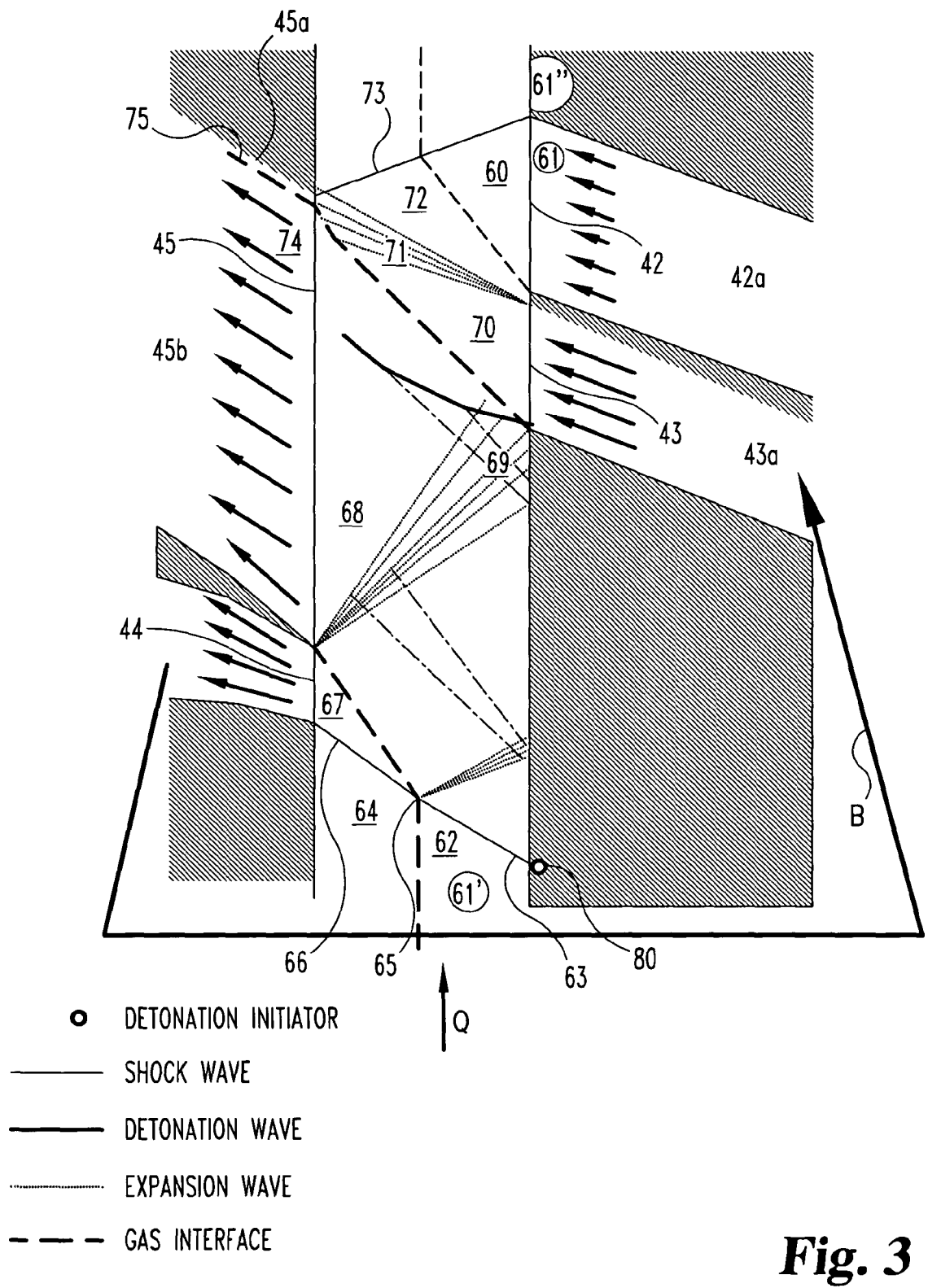
FIG. 3 is a space-time (wave) diagram for one embodiment of a pulsed detonation engine wave rotor of the present invention wherein the high-pressure energy transfer gas outlet port and the exhaust gas to-turbine port are on the same end of the device.

With reference to FIGS. 1–3, further aspects of the propulsion system 20 will be described. Compressor 21 is operable to increase the pressure of the working fluid between the compressor inlet 24 and the compressor outlet 25. The increase in working fluid pressure is represented by a pressure ratio (pressure at outlet/pressure at inlet) and the working fluid is delivered to a first wave rotor inlet port 42. The first wave rotor inlet port 42 generally defines a working fluid inlet port and is not intended to be limited to an inlet port that is coupled to the outlet of a conventional turbomachinery component. A second wave rotor inlet port 43 is referred to as a buffer gas inlet port, and is located adjacent to and sequentially prior to the first wave rotor inlet port 42. Wave rotor inlet ports 42 and 43 form an inlet port sequence, and multiple inlet port sequences can be integrated into a waver rotor device. In one preferred embodiment there are two inlet port sequences disposed along the circumference of the wave rotor device.

Wave rotor device 22 has an outlet port sequence that includes an outlet port 45 and a buffer gas outlet port 44. The outlet port 45 generally defines a combusted gas outlet port and is not intended to be limited to an outlet port that is coupled to a turbine. In the preferred embodiment of propulsion system 20 the outlet port 45 is defined as to-turbine outlet port 45. The to-turbine outlet port 45 in propulsion system 20 allows the combusted gases to exit the wave rotor device 22 and pass to the turbine 23. Compressed buffer gas exits the buffer gas outlet port 44 and is reintroduced into the rotor passageways 41 through the second wave rotor inlet port 43. In one embodiment the buffer gas outlet port 44 and the second wave rotor inlet port 43 are connected in fluid communication by a duct. In one form the duct between the outlet port 44 and outlet port 43 is integral with the wave rotor device 22 and passes through the interior of rotor 40. In another form the duct passes through the center of shaft 48. In another form of the present invention the duct is physically external to the wave rotor device 22.

The reintroduced compressed buffer gas does work on the remaining combusted gases within the rotor passageways 41 and causes the pressure in region 70 to remain at an elevated level. The relatively high energy flow of combusted gases from the to-turbine port 45 is maintained in region 74 by the reintroduction of the high pressure buffer gas entering through the second wave rotor inlet port 43. The flow of the high pressure buffer gas from buffer gas outlet port 44 to the second wave rotor inlet port 43 is illustrated schematically by arrow B in FIG. 3. In one form of the present invention a portion of the high pressure buffer gas exiting through outlet port 44 can be used as a source of turbine cooling fluid. More specifically, in certain forms of a propulsion system of the present invention the pressure of the gas stream going to the turbine 23 through exit port 45 is higher than the pressure of the working fluid at the compressor discharge 25. Therefore, the requirement for higher pressure cooling fluid can be met by taking a portion of the high pressure buffer gas exiting port 44 and delivering to the appropriate location(s) within the turbine.

Wave rotor outlet ports 44 and 45 form the outlet port sequence, and multiple outlet port sequences can be integrated into a waver rotor device. In one preferred embodiment there are two outlet port sequences disposed along the circumference of the wave rotor device. The inlet port sequence and the outlet port sequence are combined with the rotatable rotor to form a pulsed combustion wave rotor engine. Routing of the compressed buffer gas from the buffer gas outlet port 44 into the wave rotor passageways 41 via port 43 provides for: high pressure flow issuing generally uniformly from the to-turbine outlet port 45; and/or, a cooling effect delivered rapidly and in a prolonged fashion to the rotor walls defining the rotor passageways 41 following the combustion process; and/or, a reduction and smoothing of pressure in the inlet port 42 thereby aiding in the rapid and substantially uniform drawing in of working fluid from the compressor 21.

Combusted gasses exiting through the to-turbine outlet port 45 pass to the turbine 23 where shaft power is produced to power the compressor 21. Additional power may be produced to be used in the form of output shaft power. Further, combusted gas leaves the turbine 23 and enters the nozzle 32 where thrust is produced. The construction and details related to the utilization of a nozzle to produce thrust will not be described herein as it is believed known to one of ordinary skill in the art of engine design.

Referring to FIG. 2, there is illustrated a partially exploded view of one embodiment of the wave rotor device 22. Wave rotor device 22 comprises a rotor 40 that is rotatable about a centerline X and passes a plurality of fluid passageways 41 by a plurality of inlet ports 42, 43 and outlet ports 44, 45 that are formed in end plates 46 and 47. Preferably, the rotor is cylindrical, however other geometric shapes are contemplated herein. In one embodiment the end plates 46 and 47 are coupled to stationary ducted passages between the compressor 21 and the turbine 23. The pluralities of fluid passageways 41 are positioned about the circumference of the wave rotor device 22.

In one form the rotation of the rotor 40 is accomplished through a conventional rotational device. In another form the gas turbine 23 can be used as the means to cause rotation of the wave rotor 40. In another embodiment the wave rotor is a self-turning, freewheeling design; wherein freewheeling indicates no independent drive means are required. In one form the freewheeling design is contemplated with angling and/or curving of the rotor passageways. In another form the freewheeling design is contemplated to be driven by the angling of the inlet duct 42a so as to allow the incoming fluid flow to impart angular momentum to the rotor 40. In yet another form the freewheeling design is contemplated to be driven by angling of the inlet duct 43a so as to allow the incoming fluid flow to impart angular momentum to the rotor. Further, it is contemplated that the inlet ducts 42a and 43a can both be angled, one of the inlet ducts is angled or neither is angled. The use of curved or angled rotor passageways within the rotor and/or by imparting momentum to the rotor through one of the inlet flow streams, the wave rotor may produce useful shaft power. This work can be used for purposes such as but not limited to, driving an upstream compressor, powering engine accessories (fuel pump, electrical power generator, engine hydraulics) and/or to provide engine output shaft power. The types of rotational devices and methods for causing rotation of the rotor 40 is not intended to be limited herein and include other methods and devices for causing rotation of the rotor 40 as occur to one of ordinary skill in the art. One form of the present invention contemplates rotational speeds of the rotor within a range of about 1,000 to about 100,000 revolutions per minute, and more preferably about 10,000 revolutions per minute. However, the present invention is not intended to be limited to these rotational speeds unless specifically stated herein.

The wave rotor/cell rotor 40 is fixedly coupled to a shaft 48 that is rotatable on a pair of bearings (not illustrated). In one form of the present invention the wave rotor/cell rotor rotates about the centerline X in the direction of arrow Z. While the present invention has been described based upon rotation in the direction of arrow Z, a system having the appropriate modifications to rotate in the opposite direction is contemplated herein. The direction Z may be concurrent with or counter to the rotational direction of the gas turbine engine rotors. In one embodiment the plurality of circumferentially spaced passageways 41 extend along the length of the wave rotor device 22 parallel to the centerline X and are formed between an outer wall member 49 and an inner wall member 50. The plurality of passageways 41 define a peripheral annulus 51 wherein adjacent passageways share a common wall member 52 that connects between the outer wall member 49 and the inner wall member 50 so as to separate the fluid flow within each of the passageways. In an alternate embodiment each of the plurality of circumferentially spaced passageways are non-parallel to the centerline, but are placed on a cone having differing radii at the opposite ends of the rotor. In another embodiment, each of the plurality of circumferentially spaced passageways are placed on a surface of smoothly varying radial placement first toward lower radius and then toward larger radius over their axial extent. In yet another embodiment, a dividing wall member divides each of the plurality of circumferentially spaced passageways, and in one form is located at a substantially mid-radial position of the passageway. In yet another embodiment, each of the plurality of circumferentially spaced passages form a helical rather than straight axial passageway.

The pair of wave rotor end plates 46 and 47 are fixedly positioned very closely adjacent the rotor 40 so as to control the passage of working fluid into and out of the plurality of passageways 41 as the rotor 40 rotates. End plates 46 and 47 are designed to be disposed in a sealing arrangement with the rotor 40 in order to minimize the leakage of fluid between the plurality of passageways 41 and the end plates. In an alternate embodiment auxiliary seals are included between the end plates and the rotor to enhance sealing efficiency. Seal types, such as but not limited to, labrynth, gland or sliding seals are contemplated herein, however the application of seals to a wave rotor is believed known to one of skill in the art.

With reference to FIG. 3, there is illustrated a space-time (wave) diagram for a pulsed detonation wave rotor engine. A pulsed detonation combustion process is a substantially constant volume combustion process. The pulsed detonation engine wave rotor described with the assistance of FIG. 3 has: the high pressure energy transfer gas outlet port 44 and the to-turbine outlet port 45 located on the same end of the device; and the high pressure energy transfer gas inlet port 43 and the from-compressor inlet port 42 on the same end of the device. In one form of the present invention there is defined a two port wave rotor cycle including one fluid flow inlet port and one fluid flow outlet port and having a high pressure buffer gas transfer recirculation loop that may be considered internal to the wave rotor device. The high pressure energy transfer inlet port 43 is prior to and adjacent the from-compressor inlet port 42. Arrow Q indicates the direction of rotation of the rotor 40. It can be observed that upon the rotation of rotor 40, each of the plurality of passageways 41 are sequentially brought into registration with the inlet ports 42, 43 and the outlet ports 44, 45 and the path of a typical charge of fluid is along the respective passageway 41. The wave diagram for the purpose of description may be started at any point, however for convenience the description is started at 60 wherein the low-pressure working fluid is admitted from the compressor. The concept of low pressure should not be understood in an absolute manner, it is only low in comparison with the rest of the pressure levels of gas within the pulsed detonation engine wave rotor.

The low-pressure portion 60 of the wave rotor engine receives a supply of low-pressure working fluid from compressor 21. The working fluid enters passageways 41 upon the from-compressor inlet port 42 being aligned with the respective passageways 41. In one embodiment fuel is introduced into the low-pressure portion 60 by: stationary continuously operated spray nozzles (liquid) 61 or supply tubes (gas) 61 located within the inlet duct 42a leading to the from-compressor inlet port 42; or, into region 62 by intermittently actuated spray nozzles (liquid) 61' or supply tubes (gas) 61' located within the rotor; or, into region 62 by spray nozzles (liquid) 61" or supply tubes (gas) 61" located within the rotor endplate 46. Separating region 60 and 62 is a pressure wave 73 originating from the closure of the to-turbine outlet port 45. In this way, a region 62 exists at one end of the rotor and the region has a fuel content such that the mixture of fuel and working fluid is combustable. The fuel air mixture in one end of the rotor, regions 60 and 62, is thus separated from hot residual combustion gas within regions 68 and 69 by the buffer gas entering the rotor through port 43 and traveling through regions 70, 71, 72 and 64. In this way undesirable pre-ignition of the fuel air mixture of regions 60 and 62 is inhibited.

A detonation is initiated from an end portion of the rotor 40 adjacent the region 62 and a detonation wave 63 travels through the fuel air mixture within the region 62 toward the opposite end of the rotor containing a working-fluid-without-fuel region 64. In one form of the present invention the detonation is initiated by a detonation initiator 80 such as but not limited to a high energy spark discharge device. However, in an alternate form of the present invention the detonation is initiated as an auto-detonation process and does not include a detonation initiator. The detonation wave 63 travels along the length of the passageway and ceases with the absence of fuel at the gas interface 65. Thereafter, a pressure wave 66 travels into the working-fluid-without-fuel region 64 of the passageway and compresses this working fluid to define a high-pressure buffer/energy transfer gas within region 67. The concept of high pressure should not be understood in an absolute manner, it is only high in comparison with the rest of the pressure level of gas within the pulsed detonation engine wave rotor.

In one embodiment the high pressure buffer/energy transfer gas is a non-vitiated working fluid. In another embodiment the high pressure buffer/energy transfer gas is comprised of working fluid having experienced the combustion of fuel (vitiated) regardless of what other compression or expansion process have taken place after the combustion. Working fluid of this type would generally be characterized as having a portion of the oxygen depleted, the products of combustion present and the associated entropy increase remaining relative to the non-combusted working fluid starting from the same initial state and undergoing the same post combustion processes. An incomplete mixing can take place between the vitiated and non-vitiated gas portions adjoining each other in the passageway and thus realize a mixture of the two which thus comprises the high pressure buffer/energy transfer gas.

The high pressure buffer/energy transfer gas within region 67 exits the wave rotor device 22 through the buffer gas outlet port 44. The combustion gases within the region 68 exit the wave rotor through the to-turbine outlet port 45. Expansion of the combusted gas prior to entering the turbine results in a lower turbine inlet temperature without reducing the effective peak cycle temperature. As the combusted gas exits the outlet port 45, the expansion process continues within the passageway 41 of the rotor and travels toward the opposite end of the passageway. As the expansion arrives at the end of the passage, the pressure of the gas within the region 69 at the end of the rotor opposite the to-turbine outlet port 45 declines. The wave rotor inlet port 43 opens and allows the flow of the high pressure buffer/energy transfer working fluid into the rotor at region 70 and causes the recompression of a portion of the combustion gases within the rotor. In one embodiment, the admission of gas via port 43 can be accomplished by a shock wave. However, in another embodiment the admission is accomplished without a shock wave. The flow of the high pressure buffer gas adds energy to the exhaust process of the combustion gas and allows the expansion of the combusted gas to be accomplished in a controlled uniform energy process in one form of the invention. Thus, in one form the introduction of the high pressure buffer/energy transfer gas is adapted to maintain the high velocity flow of combusted gases exiting the wave rotor until substantially all of the combusted gas within the rotor is exhausted.

In one embodiment, the wave rotor inlet port 43, which allows the introduction of the high-pressure buffer/energy transfer gas, closes before the to-turbine outlet port 45 is closed. The closing of the wave rotor inlet port 43 causes an expansion process to occur within the high pressure buffer/energy transfer air within region 71 and lowers the pressure of the gas and creates a region 72. Following the creation of this lowered pressure gas region 72, a passageway 41 is in registration with port 42 and gas flowing within port 42 enters the passageway 41 creating region 60. The strong and compact nature of the expansion process in region 71 causes a beneficially large pressure difference between the pressure in port 45 and the pressure in port 42. In one embodiment the pressure of the gas delivered to the turbine 23 is higher than the pressure delivered from the compressor 21 and hence the power output of the engine enhanced and/or the quantity of fuel required to generate power in the turbine is reduced. The term enhanced and reduced are in reference to an engine utilizing a combustion device of common practice, having constant or lowering pressure, located between the compressor and turbine in the place of the present invention. The expansion process 71 occurs within the buffer/energy transfer gas and allows substantially all of the combustion gases of region 68 to exit the rotor leaving the lowest pressure region of the rotor consisting essentially of expanded buffer/energy transfer gas. The to-turbine outlet port 45 is closed as the expansion in region 71 reaches the exit end of the passageway. In one form of the present invention as illustrated in region 75 a portion of the high-pressure buffer/energy transfer gas exits through the outlet port 45. This gas acts to insulate the duct walls 45a from the hot combusted gas within region 74 of the duct 45b. In an alternate embodiment the high pressure buffer/energy transfer gas is not directed to insulate and cool the duct walls 45a. The pressure in region 72 has been lowered, and the from-compressor inlet port 42 allows pre-compressed low-pressure air to enter the rotor passageway in the region 60 having the lowered pressure. The entering motion of the precompressed low-pressure air through port 42 is stopped by the arrival of a pressure wave 73 originating from the exit end of the rotor and traveling toward the inlet end. The pressure wave 73 originated from the closure of the to-turbine outlet port 45. The design and construction of the wave rotor is such that the arrival of pressure wave 73 corresponds with the closing of the from-compressor inlet port 42.

Figure 4:
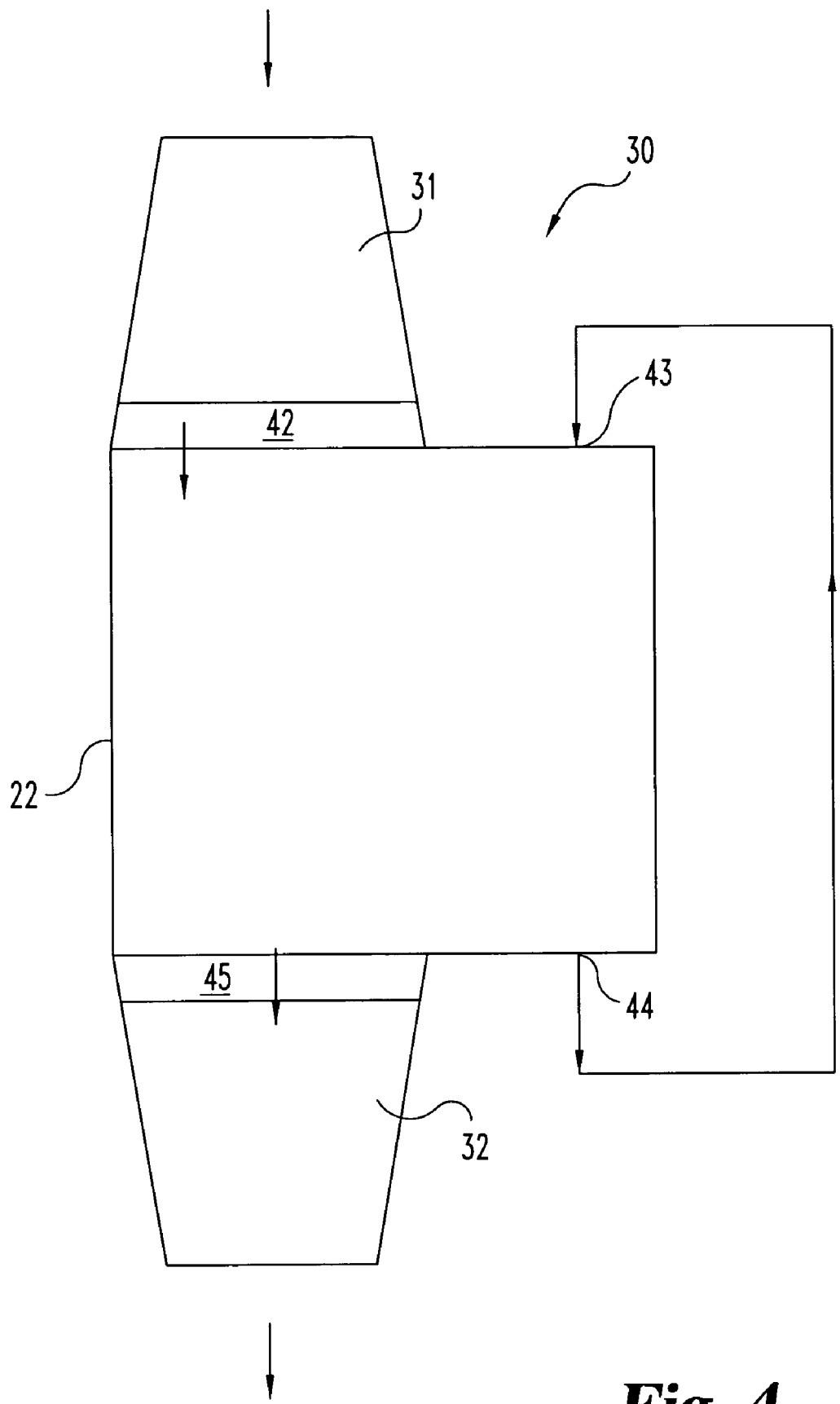
FIG. 4 is a schematic representation of a pulsed combustion engine wave rotor intended to be used as a direct thrust-producing propulsion system without conventional turbomachinery components.

With reference to FIG. 4, there is illustrated schematically an alternate embodiment of a propulsion system 30. In one embodiment the propulsion system 30 includes a fluid inlet 31, a pulsed combustion detonation engine wave rotor 22 and nozzle 32. The wave rotor device 22 is identical to the wave rotor described in propulsion system 20 and like feature number will be utilized to describe like features. In one form propulsion system 30 is adapted to produce thrust without incorporation of conventional turbomachinery components. In one embodiment the combustion gases exiting the wave rotor are directed through the nozzle 32 to produce motive power. The working fluid passing through inlet 31 is conveyed through the first wave rotor inlet port 42 and into the wave rotor device 22. High pressure buffer gas is discharged through wave rotor outlet port 44 and passes back into the wave rotor device through wave rotor inlet port 43. The relatively high energy flow of combusted gases flows out of outlet port 45 and exits nozzle 32.

Figure 5:
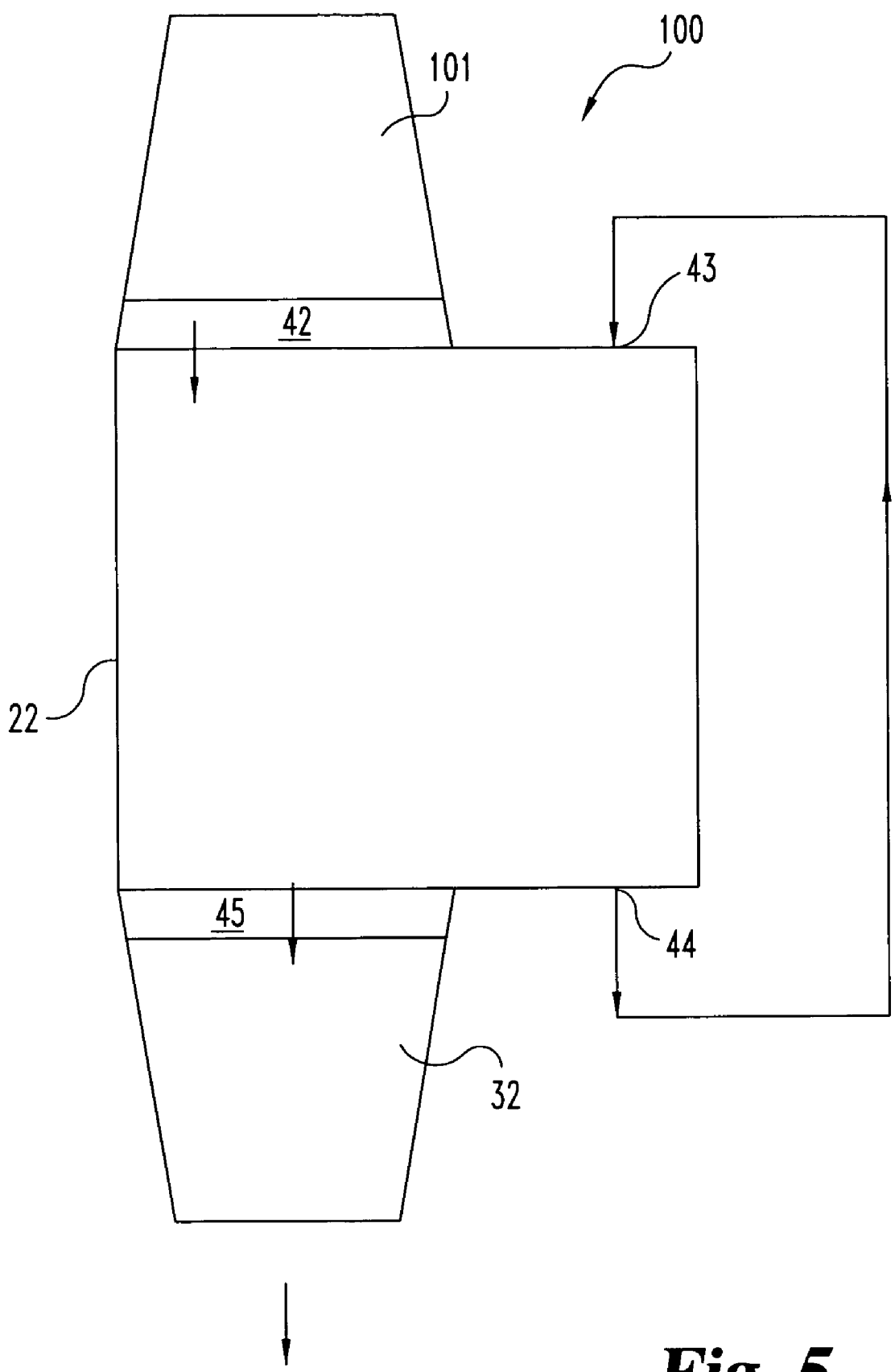
FIG. 5 is a schematic representation of another embodiment of a pulsed combustion engine wave rotor intended to be used as a direct thrust-producing propulsion system without conventional turbomachinery components.

With reference to FIG. 5, there is illustrated schematically an alternate embodiment of a rocket type propulsion system 100. In one embodiment, the propulsion system 100 includes an oxidizer and working gas storage tank 101, a pulsed combustion detonation engine wave rotor 22 and nozzle 32. The wave rotor device 22 is identical to the wave rotor device discussed previously for propulsion system 20 and like feature numbers will be utilized to describe like features. In one form propulsion system 100 is adapted to produce thrust without incorporation of conventional turbomachinery components. The first wave rotor inlet port 42 is in fluid communication with the oxidizer and working gas storage tank 100 and receives a quantity of working fluid therefrom. High pressure buffer gas is discharged through the wave rotor outlet port 44 and passes back into the wave rotor device through wave rotor inlet port 43. The relatively high energy flow of combusted gases pass out of the outlet port 45 and exits nozzle 32 to produce motive power.

A few additional alternate embodiments (not illustrated) contemplated herein will be described in comparison to the embodiment of FIG. 4. The use of like feature numbers is intended to represent like features. One of the alternate embodiments is a propulsion system including a turbomachine type compressor placed immediately ahead of the wave rotor 22 and adapted to supply a compressed fluid to inlet 42. The turbomachine type compressor is driven by shaft power derived from the wave rotor 22. Another of the alternate embodiments includes a conventional turbine placed downstream of the wave rotor 22 and adapted to be supplied with the gas exiting port 45. The second type of alternate embodiment does not include a nozzle and delivers only engine output shaft power. A third embodiment contemplated herein is similar to the embodiment of FIG. 1, but the nozzle 32 has been removed and is utilized for delivering output shaft power. The prior list of alternate embodiments is not intended to be limiting to the types of alternate embodiments contemplated herein.

Figure 6:
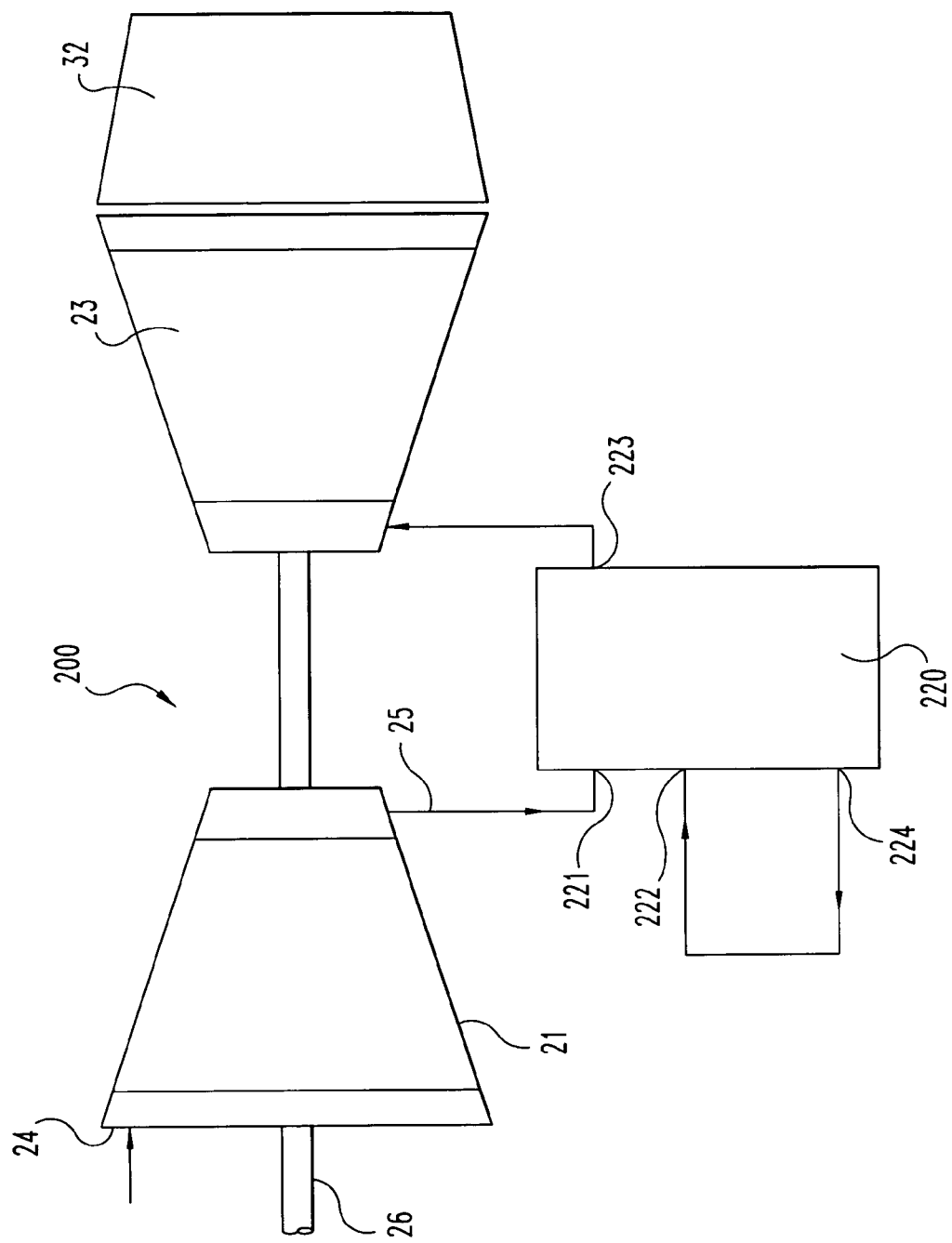
FIG. 6 is a schematic representation of an alternate embodiment of a propulsion system comprising a compressor, a pulsed combustion engine wave rotor, a turbine, a nozzle and an output power shaft.

With reference to FIG. 6, there is illustrated a schematic representation of an alternate embodiment of propulsion system 200 which includes compressor 21, a pulsed combustion wave rotor 220, a turbine 23, a nozzle 32 and an output power shaft 26. The propulsion system 200 is substantially similar to the propulsion system 20 and like features numbers will be utilized to describe like elements. More specifically, the propulsion system 200 is substantially similar to the propulsion system 20 and the details relating to system 200 will focus on the alternative pulsed detonation engine wave rotor 220.

Figure 7:
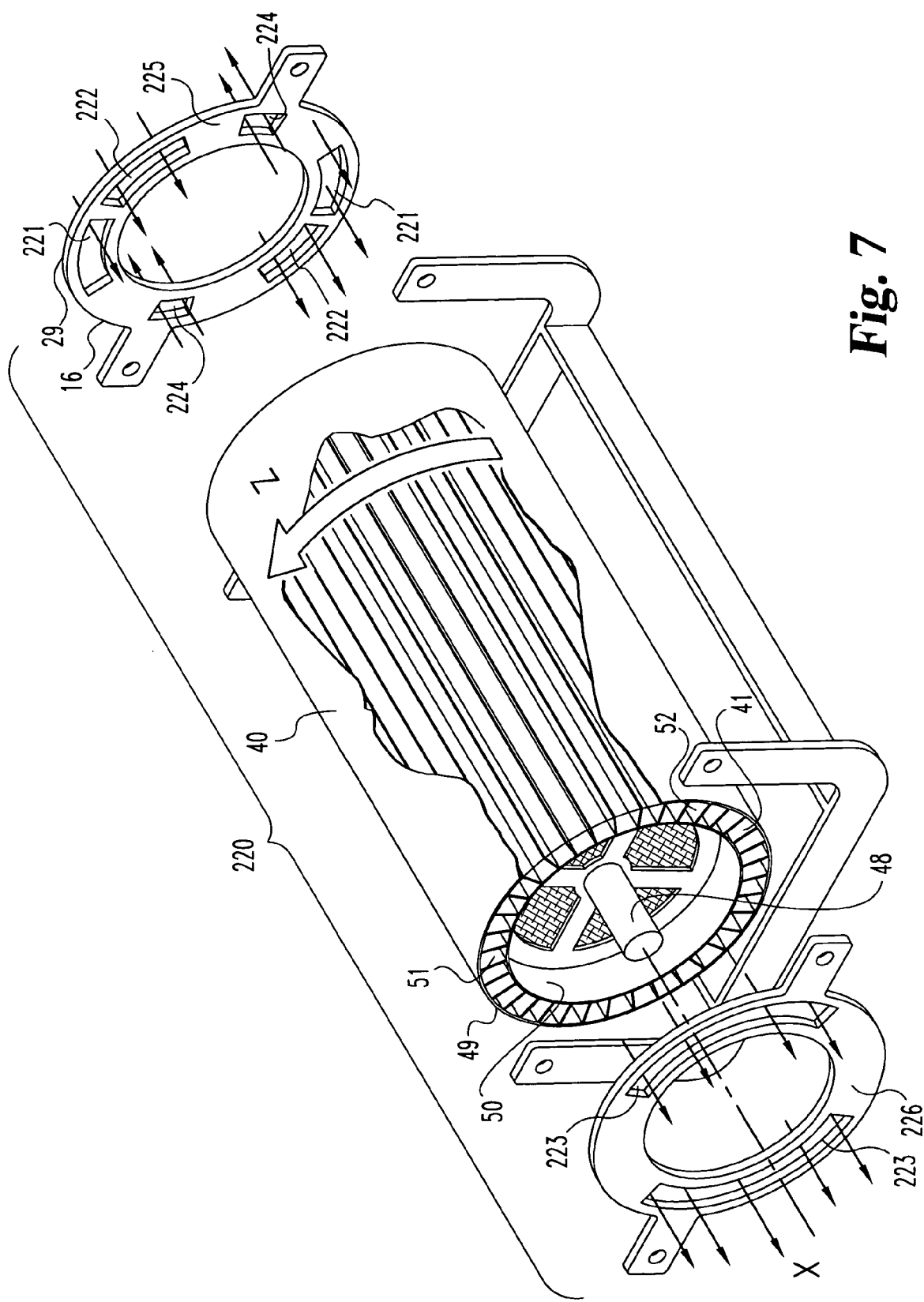
FIG. 7 is a partially exploded view of one embodiment of a pulsed combustion engine wave rotor comprising a portion of FIG. 6.
Figure 8:
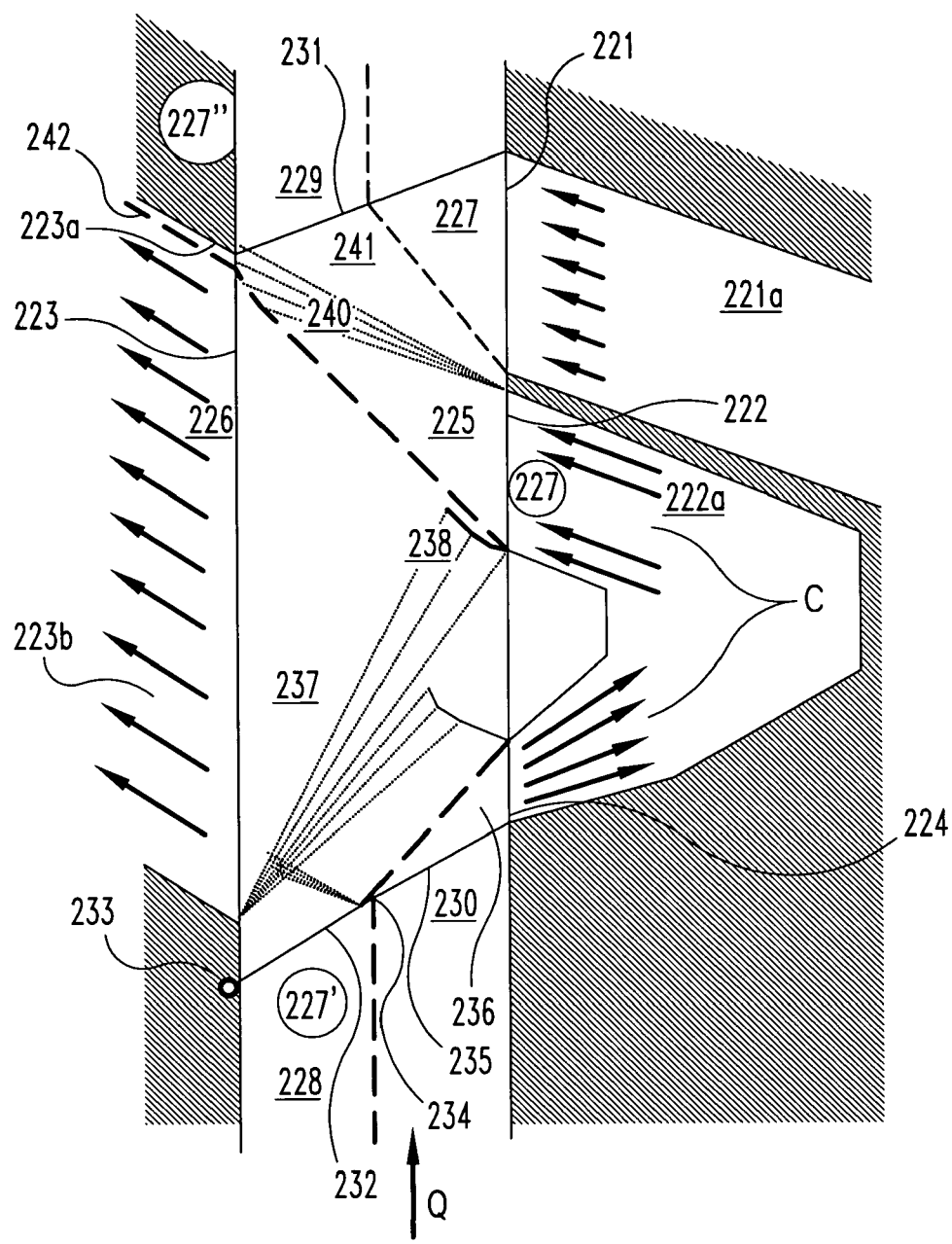
FIG. 8 is a space-time (wave) diagram for an alternate embodiment of a pulsed detonation engine wave rotor wherein the high-pressure energy transfer gas outlet port and the combustion gas exit port are on opposite ends of the device.

With reference to FIGS. 6–8, further aspects of the propulsion system 200 will be described. As discussed previously, a substantial portion of the propulsion system 200 is identical to the propulsion system 20 and this information will not be repeated as it has been set forth previously. A pressurized working fluid passes through the compressor outlet 25 and is delivered to a first wave rotor inlet port 221. A second wave rotor inlet port 222 is referred to as a buffer gas inlet port, and is located adjacent to and sequentially prior to the first wave rotor inlet port 221. Wave rotor inlet ports 221 and 222 form an inlet port sequence, and multiple inlet port sequences can be integrated into a wave rotor device. In one preferred embodiment there are two inlet port sequences disposed along the circumference of the wave rotor device 220.

Wave rotor device 220 has an outlet port sequence that includes an outlet port 223 and a buffer gas outlet port 224. In one embodiment of propulsion system 200 the outlet port 223 is defined as a to-turbine outlet port 223. The to-turbine outlet port 223 of propulsion system 200 allows the combusted gases to exit the wave rotor device 220 and pass to the turbine 223. Compressed buffer gas exits the buffer gas outlet port 224 and is reintroduced into the rotor passageways 41 through the second wave rotor inlet port 222. In one embodiment, the buffer gas outlet port 224 and the second wave rotor inlet port 222 are connected in fluid communication by a duct. In a further alternate embodiment, the duct functions as a high pressure buffer gas reservoir and/or is connected to an auxiliary reservoir which is designed and constructed to hold a quantity of high pressure buffer gas. This reintroduced buffer gas does work on the remaining combusted gases within the rotor passageways 41 and causes the pressure in region 225 to remain at an elevated level. The relatively high energy flow of combusted gases from the to-turbine port 223 is maintained in region 226 by the reintroduction of the high pressure buffer gas entering through the second wave rotor inlet port 222. The flow of the high pressure buffer gas from buffer gas outlet port 224 to the second wave rotor inlet port 222 is illustrated schematically by arrows C in FIG. 8.

Wave rotor outlet ports 223 and 224 form the outlet port sequence, and multiple outlet port sequences can be integrated into a wave rotor device. In one preferred embodiment, there are two outlet port sequences disposed along the circumference of the wave rotor device. The inlet port sequence and the outlet port sequence are combined with the rotatable rotor to form a pulsed combustion wave rotor engine. Routing of the compressed buffer gas from the buffer gas outlet port 224 into the wave rotor passageways 41 provides for: high pressure flow issuing generally uniformly from the to-turbine outlet port 223; and/or a cooling effect delivered rapidly and in a prolonged fashion to the rotor walls defining the rotor passageways 41 following the combustion process; and/or a reduction and smoothing of pressure in the inlet port 221 thereby aiding in the rapid and uniform admission of working fluid from compressor 21.

Referring to FIG. 7, there is illustrated a partially exploded view of one embodiment of the wave rotor device 220. Wave rotor 220 comprises a cylindrical rotor 40 that is rotatable about a centerline X and passes a plurality of fluid passageways 41 by a plurality of ports 221, 222 and 224 formed in end plate 225 and outlet ports 223 formed in end plate 226. In one embodiment, the end plates 225 and 226 are coupled to stationery ducted passages between the compressor 21 and the turbine 23. The plurality of fluid passageways 41 is positioned about the circumference of the wave rotor device 220.

In one form a conventional rotational device accomplishes the rotation of rotor 40. In another form the gas turbine 23 can be used as the means to cause rotation of the wave rotor 40. In another embodiment the wave rotor is a self-turning, freewheeling design; wherein freewheeling indicates no independent drive means are required. In one form, the freewheeling design is contemplated with angling and/or curving of the rotor passageways. In another form, the freewheeling design is contemplated to be driven by the angling of the inlet duct 221a so as to allow the incoming fluid flow to impart angular momentum to the rotor 40. In yet another form, the free-wheeling design is contemplated to be driven by angling of the inlet duct 222a so as to allow the incoming fluid flow to impart angular momentum to the rotor. Further, it is contemplated that the inlet ducts 222a and 221a can both be angled, one of the inlet ducts is angled or neither is angled. The use of curved or angled rotor passageways within the rotor and/or by imparting of momentum to the rotor through one of the inlet flow streams, the wave rotor may produce useful shaft power.

The wave rotor/cell rotor 40 is fixedly coupled to a shaft 48 that is rotatable on a pair of bearings (not illustrated). In one form of the present invention, the wave rotor/cell rotor rotates about the center line X in the direction of arrows Z. While the present invention has been described based upon rotation in the direction of arrow Z, a system having the appropriate modifications to rotate in the opposite direction is contemplated herein. The direction Z may be concurrent with or counter to the rotational direction of the gas turbine engine rotors. In one embodiment the plurality of circumferentially spaced passageways 41 extend along the length of the wave rotor device 220 parallel to the center line X and are formed between the outer wall member 49 and an inner wall member 50. The plurality of passageways 41 define a peripheral annulus 51 wherein adjacent passageways share a common wall member 52 that connects between the outer wall member 49 and the inner wall 50 so as to separate the fluid flow within each of the passageways. In an alternate embodiment each of the plurality of circumferentially spaced passageways are non-parallel to the center line, but are placed on a cone having different radii at the opposite ends of the rotor. In another embodiment, a dividing wall member divides each of the plurality of circumferentially spaced passageways, and in one form is located at a substantially mid-radial position. In yet another embodiment, each of the plurality of circumferentially spaced passageways form a helical rather than straight passageway. Further, in another embodiment, each of the plurality of circumferentially spaced passageways are placed on a surface of smoothly varying radial placement first toward lower radius and then toward larger radius over their axial extent.

The pair of wave rotor end plates 225 and 226 are fixedly positioned very closely adjacent to rotor 40 so as to control the passage of working fluid into and out of the plurality of passageways 41 as the rotor 40 rotates. End plates 225 and 226 are designed to be disposed in a sealing arrangement with the rotor 40 in order to minimize the leakage of fluid between the plurality of passageways 41 and the end plates. In an alternate embodiment, auxiliary seals are included between the end plates and the rotor to enhance sealing efficiency. Seal types, such as but not limited to, labrynth, gland or sliding seals are contemplated herein, however, the application of seals to a wave rotor is believed known to one of skill in the art.

With reference to FIG. 8, there is illustrated a space-time (wave) diagram for a pulsed detonation wave rotor engine. The pulsed detonation engine wave rotor described with the assistance of FIG. 8 has: the high pressure energy transfer gas outlet port 224, the high pressure energy transfer gas inlet port 222 and the from-compressor inlet port 221 on the same end of the device; and the to-turbine outlet port 223 located on the opposite end of the device. In one form of the present invention there is defined a two port wave rotor cycle including one fluid flow inlet port and one fluid flow outlet port and having a high pressure buffer gas recirculation loop that may be considered internal to the wave rotor device. The high pressure energy transfer inlet port 222 is prior to and adjacent the from-compressor inlet port 221. It can be observed that upon the rotation of rotor 40 each of the plurality of passageways 41 are sequentially brought in registration with the inlet ports 221 and 222 and the outlet ports 223 and 224, and the path of a typical charge of fluid is along the respective passageways 41. The wave diagram for the purpose of description may be started at any point, however, for convenience, the description is started at 227 wherein the low-pressure working fluid is admitted from the compressor. The concept of low pressure should not be understood in absolute manner, it is only low in comparison with the rest of the pressure level of gas within the pulsed detonation engine wave rotor.

The low pressure portion 227 of the wave rotor engine receives a supply of low-pressure working fluid from compressor 21. The working fluid enters passageways 41 upon the from-compressor inlet port 221 being aligned with the respective passageways 41. In one embodiment fuel is introduced into the region 225 by: stationery continuously operated spray nozzles (liquid) 227 or supply tubes (gas) 227 located within the duct 222*a* leading to the high pressure energy transfer gas inlet port 222; or, into region 228 by intermittently actuated spray nozzles (liquid) 227' or supply tubes (gas) 227' located within the rotor; or, into region 228 by spray nozzles (liquid) 227" or supply tubes (gas) 227" located within the rotor end plate 226. Region 228 exists at the end of the rotor and the region has a fuel content such that the mixture of fuel and working fluid is combustable.

A detonation is initiated from an end portion of the wave rotor 40 adjacent the region 228 and a detonation wave 232 travels through the fuel-working-fluid air mixture within the region 228 toward the opposite end of the rotor containing a working-fluid-without-fuel region 230. In one form of the present invention, the detonation is initiated by a detonation initiator 233, such as but not limited to a high energy spark discharge device. However, in an alternate form of the present invention the detonation is initiated by an auto-detonation process and does not include a detonation initiator. The detonation wave 232 travels along the length of the passageway and ceases with the absence of fuel at the gas interface 234. Thereafter, a pressure wave 235 travels into the working-fluid-without-fuel region 230 of the passageway and compresses this working fluid to define a high-pressure buffer/energy transfer gas within region 236. The concept of high pressure should not be understood in an absolute manner, it is only high in comparison with the rest of the pressure level of gas within the pulsed detonation engine wave rotor.

The high pressure buffer/energy transfer gas within region 236 exits the wave rotor device 220 through the buffer gas outlet port 224. The combusted gases within the region 237 exits the wave rotor through the to-turbine outlet port 223. Expansion of the combusted gas prior to entering the turbine results in a lower turbine inlet temperature without reducing the effective peak cycle temperature. As the combusted gas exits the outlet port 223, the expansion process continues within the passageways 41 of the rotor and travels toward the opposite end of the passageway. As the expansion arrives at the end of the passage, the pressure of the gas within the region 238 at the end of the rotor opposite the to-turbine outlet port 223 declines. The wave rotor inlet port 222 opens and allows the flow of the high pressure buffer/energy transfer working fluid into the rotor at region 225 and causes the recompression of a portion of the combusted gases within the rotor. The admission of gas via port 222 can be accomplished by a shock wave. The flow of the high pressure buffer gas adds energy to the exhaust process of the combustion gas and allows the expansion of the combusted gas to be accomplished in a controlled, uniform energy process in one form of the invention. Thus, in one form the introduction of the high pressure buffer/energy transfer gas is adapted to maintain the high velocity flow of combusted gases exiting the wave rotor until substantially all of the combusted gas within the rotor is exhausted.

In one embodiment, the wave rotor inlet port 222, which allows the introduction of the high pressure buffer/energy transfer gas, closes before the to-turbine outlet port 223 is closed. The closing of the wave rotor inlet port 222 causes an expansion process to occur within the high pressure buffer/energy transfer air within region 240 and lowers the pressure of the gas and creates a region 241. This expansion process occurs within the buffer/energy transfer gas and allows this gas to preferentially remain within the rotor at the lowest pressure region of the rotor. The to-turbine outlet port 223 is closed as the expansion in region 240 reaches the exit end of the passageway. In one form of the present invention as illustrated in region 242, a portion of the high pressure buffer/energy transfer gas exits through the outlet port 223. This exiting buffer/energy transfer gas functions to insulate the duct wall 223*a* from the hot combusted gas within region 226 of the duct 223*b*. The pressure in region 241 has been lowered and the from-compressor inlet port 221 allows pre-compressed low pressure working fluid to enter the rotor passageways in the region 227 having the lowered pressure. The entering motion of the pre-compressed low-pressure working fluid through port 221 is stopped by the arrival of pressure wave 231 originating from the exit end of the rotor and traveling toward the inlet end. The pressure wave 231 originated from the closure of the to-turbine outlet port 223. The design and construction of the wave rotor is such that the arrival of the pressure wave 231 corresponds with the closing of the from-compressor inlet port 221.

Figure 9:
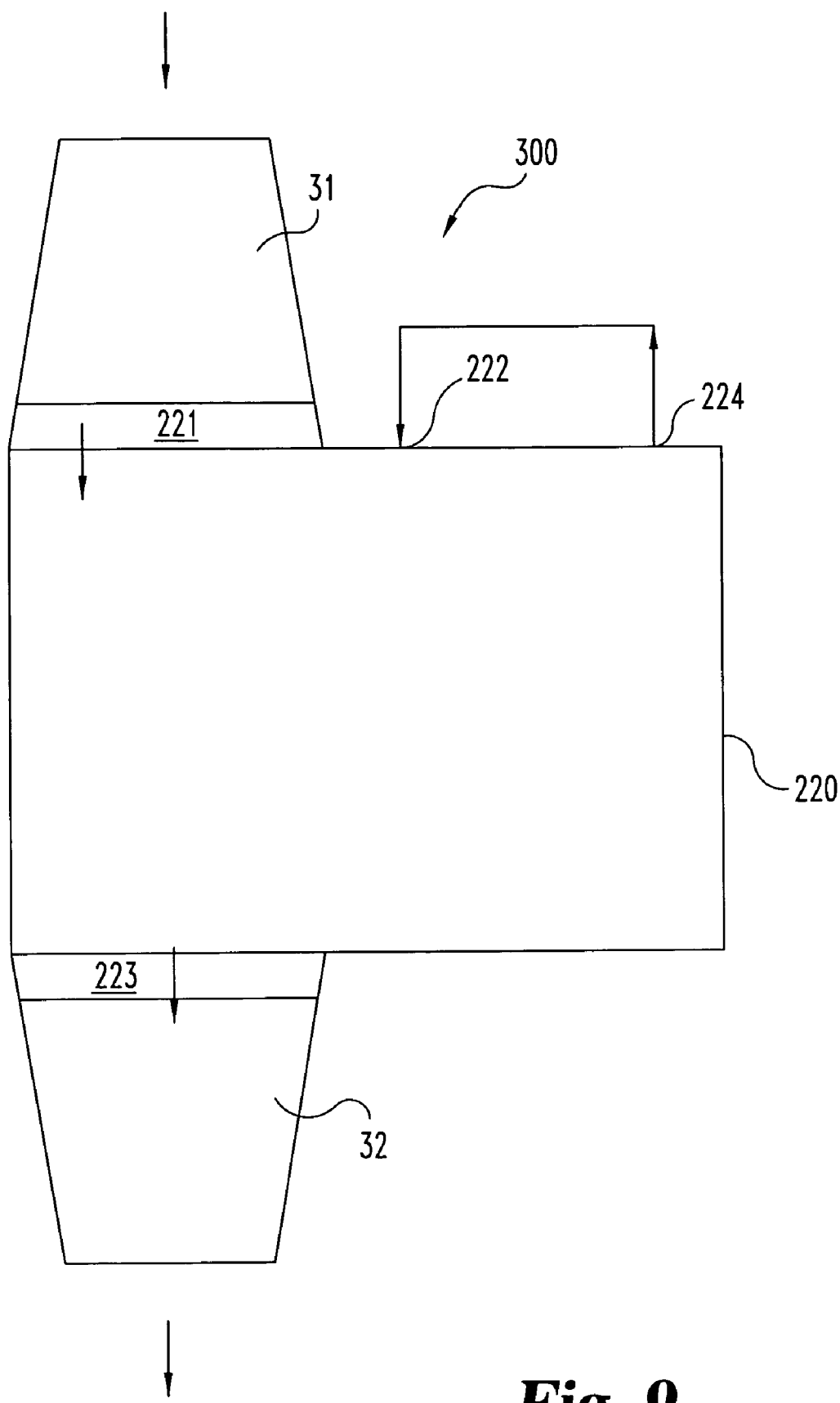
FIG. 9 is a schematic representation of a pulsed combustion engine wave rotor intended to be used as a direct thrust-producing propulsion system without conventional turbomachinery components.

With reference to FIG. 9, there is illustrated schematically an alternate embodiment of a propulsion system 300. In one embodiment the propulsion system 300 includes a fluid inlet 31, a pulsed combustion detonation engine wave rotor 220 and a nozzle 32. The wave rotor device 220 is identical to the wave rotor described in propulsion system 200 and like feature numbers will be utilized to indicate like features. In one form propulsion system 30 is adapted to produce thrust without incorporation of conventional turbomachinery components. The working fluid passing through the inlet 31 is conveyed through the first wave rotor inlet port 221 and into the wave rotor 220. High pressure buffer gas is discharged through wave rotor outlet port 224 and passes back into the wave rotor device through wave rotor inlet port 222. The relatively high energy flow of combusted gases flows out of the outlet port 223 and exits through nozzle 32 to produce motive power.

Figure 10:
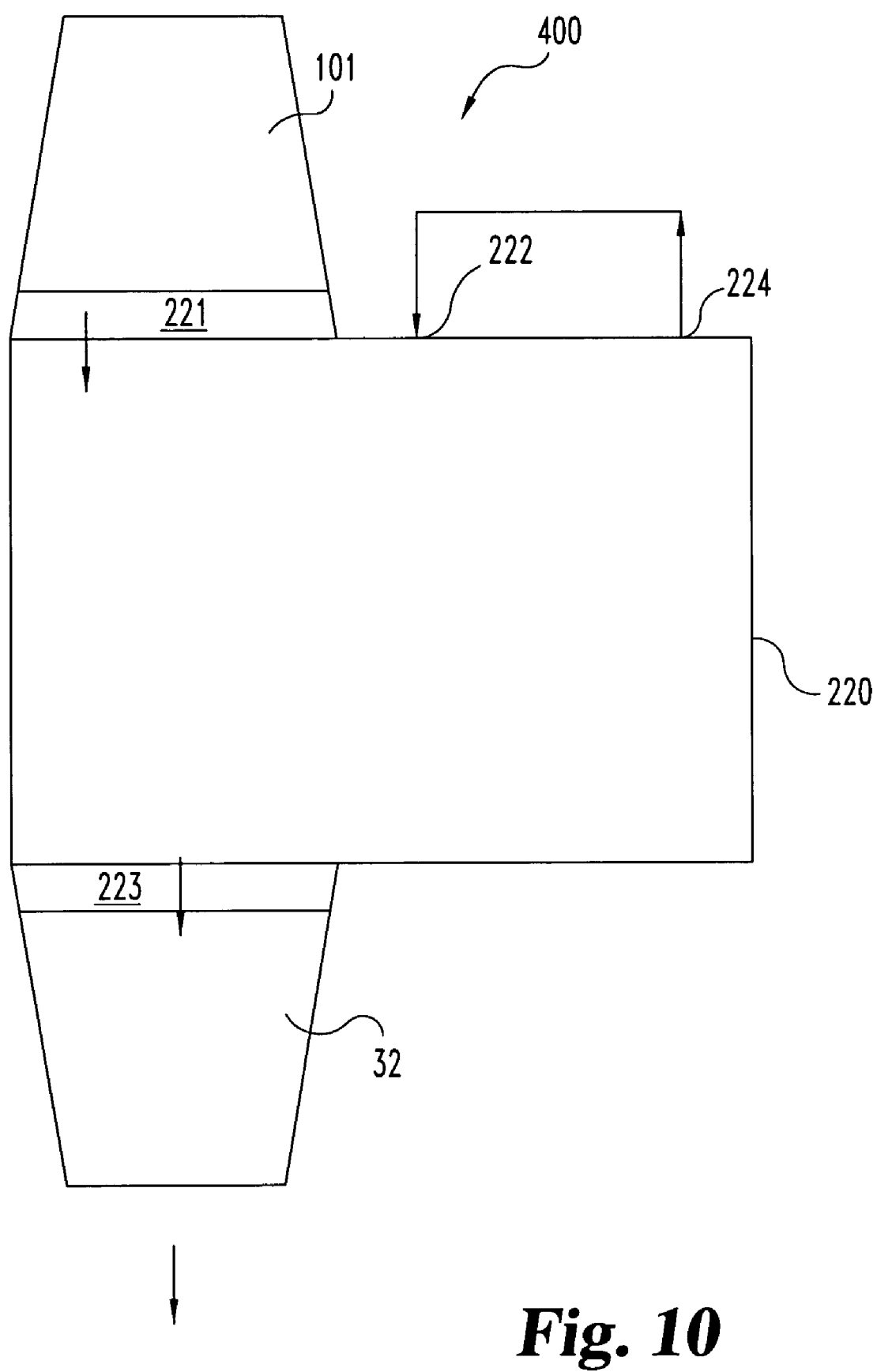
FIG. 10 is a schematic representation of another embodiment of a pulsed combustion engine wave rotor intended to be used as a direct thrust-producing propulsion system without conventional turbomachinery components.

With reference to FIG. 10, there is illustrated schematically an alternate embodiment of a rocket type propulsion system 400. In one embodiment, the propulsion system 400 includes an oxidizer and working gas storage tank 101, a pulsed combustion detonation engine wave rotor 220 and a nozzle 32. The wave rotor device 220 is identical to the wave rotor described in propulsion system 200 and like feature numbers will be utilized to indicate like features. In one form propulsion system 400 is adapted to produce thrust without incorporation of conventional turbomachinery components. The first wave rotor inlet port 221 is in fluid communication with the oxidizer and working gas storage tank 101 and receives a quantity of working fluid therefrom. High pressure buffer gas is discharged through the wave rotor outlet port 224 and passes back into the wave rotor device through wave rotor inlet port 222. The relatively high energy flow of combusted gases pass out of the outlet port 223 and exits nozzle 32 to produce motive power.

A few of the additional alternate embodiments (not illustrated) contemplated herein will be described in comparison to the embodiment of FIG. 9. The utilization of like feature numbers is intended to represent like features. One of the alternate embodiments includes a turbomachine type compressor placed immediately ahead of the wave rotor 220 and adapted to supply a compressed fluid to inlet 221. The turbomachine type compressor is driven by shaft power derived from the wave rotor 220. A second alternate embodiment includes a conventional turbine placed downstream of the wave rotor 220 and adapted to be supplied with the gas exiting port 223. The second type of alternate embodiment does not include a nozzle and delivers only engine output shaft power.

Figure 11:
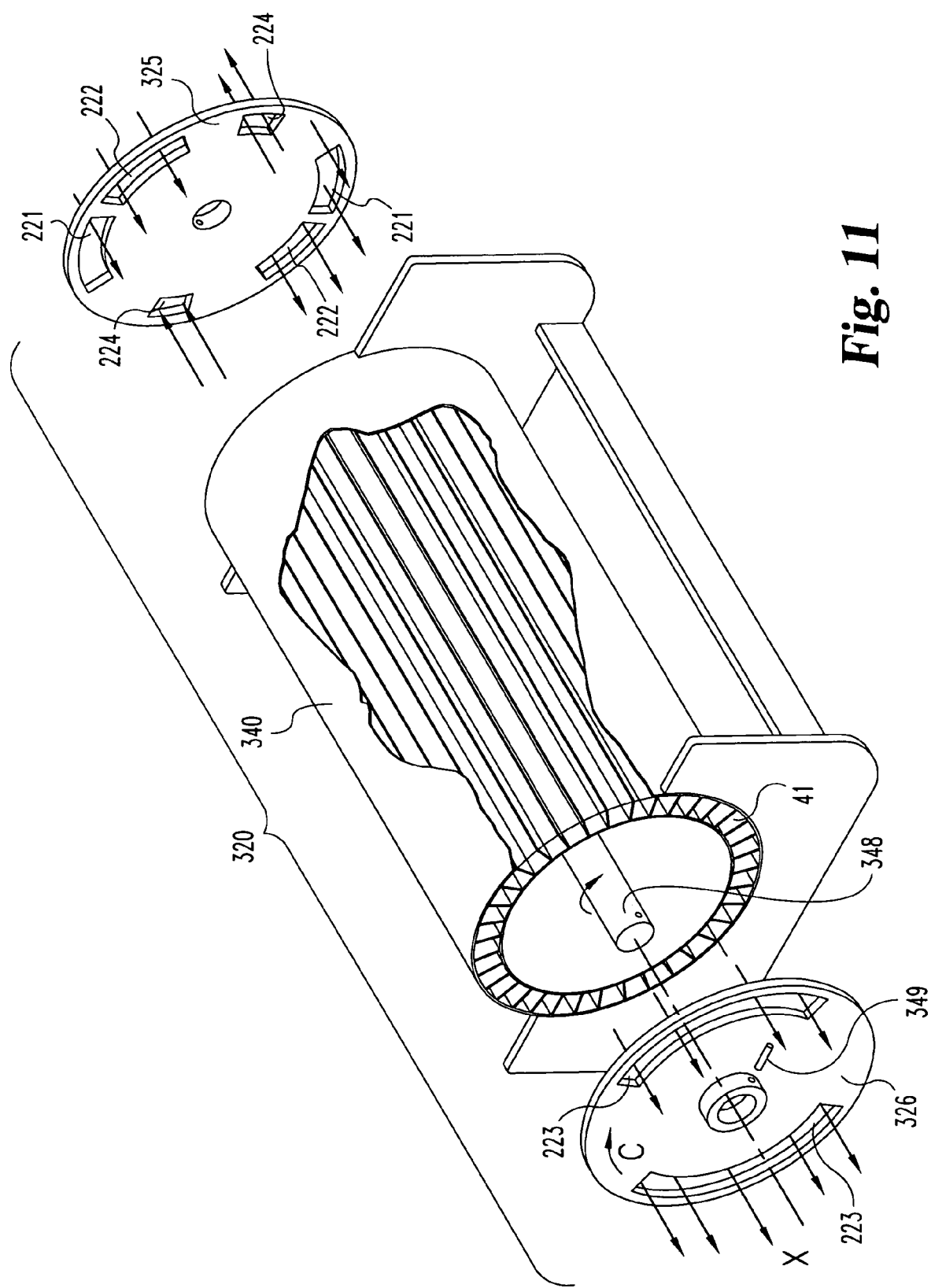
FIG. 11 is a partially exploded view of another embodiment of a pulsed combustion engine wave rotor comprising stationary fluid flow passageways between rotatable endplates having inlet and outlet ports.

The present invention is also applicable to a mechanical device wherein the plurality of fluid flow passageways are stationery, the inlet and outlet ports are rotatable, and the gas flows and processes occurring within the fluid flow passageways are substantially similar to those described previously in this document. Referring to FIG. 11, there is illustrated a partially exploded view of one embodiment of the wave rotor device 320. The description of a wave rotor device having rotatable inlet and outlet ports is not limited to the embodiment of device 320, and is applicable to other wave rotors including but not limited to the embodiments associated with FIGS. 1–5 and 9–10. The utilization of like feature numbers will be utilized to describe like features. In one form wave rotor device 320 comprises a stationary portion 340 centered about a centerline X and having a plurality of fluid passageways 41 positioned between two rotatable endplates 325 and 326. The endplates 325 and 326 are rotated to pass by the fluid passageways a plurality of inlet ports 221 and 222 and outlet ports 224 and 223. Endplates 325 and 326 are connected to shaft 348 and form a rotatable endplate assembly. In one embodiment a member 349 mechanically fixes the endplates 325 and 326 to the shaft 348. Further, the endplate assembly is rotatably supported by bearings, which are not illustrated. In one embodiment the endplates 325 and 326 are fitted adjacent to stationary ducted passages between the compressor 21 and turbine 23. Sealing between the stationary ducts and the rotating endplates is accomplished by methods and devices believed known of those skilled in the art. In a preferred form the stationary portion 340 defines a ring and the plurality of fluid passageways 41 are positioned about the circumference of the ring.

In one form a conventional rotational device is utilized to accomplish the rotation of the endplate assembly including endplates 325 and 326. In another form the gas turbine 23 can be used as the means to cause rotation of the endplates 325 and 326. In another embodiment the endplate assembly is a self-turning, freewheeling design; wherein freewheeling indicates no independent drive means are required. In one form the freewheeling design is contemplated with the use of an endplate designed so as to capture a portion of the momentum energy of the fluid exit stream of port 224 and hence provide motive force for rotation of the endplate. In another form the freewheeling design is contemplated to be driven by a portion of the momentum energy of the exit stream of port 223. In another form the freewheeling design is contemplated to be driven by a portion of the momentum energy of the inlet stream of port 222. In yet another form the freewheeling design is contemplated to be driven by a portion of the momentum energy of the inlet stream of port 221. In all cases a portion of the endplate port flowpath may contain features turning the fluid stream within one or two exit endplate port flowpaths and one or two inlet endplate port flowpaths in the tangential direction hence converting fluid momentum energy to power to rotate the endplate. The use of curved or angled passageways within the stationary portion 340 may aid in this process by imparting tangential momentum to the exit flow streams which may be captured within the endplate through turning of the fluid stream back to the axial direction. In each of these ways the rotating endplate assembly may also provide useful shaft power beyond that required to turn the endplate assembly. This work can be used for purposes such as but not limited to, driving an upstream compressor, powering engine accessories (fuel pump, electrical power generator, engine hydraulics) and/or to provide engine output shaft power. The types of rotational devices and methods for causing rotation of the endplate assembly is not intended to be limited herein and include other methods and devices for causing rotation of the endplate assembly as occur to one of ordinary skill in the art. One form of the present invention contemplates rotational speeds of the endplate assembly within a range of about 1,000 to about 100,000 revolutions per minute, and more preferably about 10,000 revolutions per minute. However, the present invention is not intended to be limited to these rotational speeds unless specifically stated herein.

The endplates 325 and 326 are fixedly coupled to the shaft 348 that is rotatable on a pair of bearings (not illustrated). In one form of the present invention the endplates rotate about the centerline X in the direction of arrow C. While the present invention has been described based upon rotation in the direction of arrow C, a system having the appropriate modifications to rotate in the opposite direction is contemplated herein. The direction C may be concurrent with or counter to the rotational direction of the gas turbine engine rotors.

The pair of rotating endplates 325 and 326 are fixedly positioned very closely adjacent the stationary portion 340 so as to control the passage of working fluid into and out of the plurality of passageways 41 as the endplates rotate. Endplates 325 and 326 are designed to be disposed in a sealing arrangement with the stationary portion 340 in order to minimize the leakage of fluid between the plurality of passageways 41 and the endplates. In an alternate embodiment auxiliary seals are included between the end plates and the rotor to enhance sealing efficiency. Seal types, such as but not limited to, labrynth, gland or sliding seals are contemplated herein, however the application of seals to a wave rotor is believed known to one of skill in the art.

Figure 12:
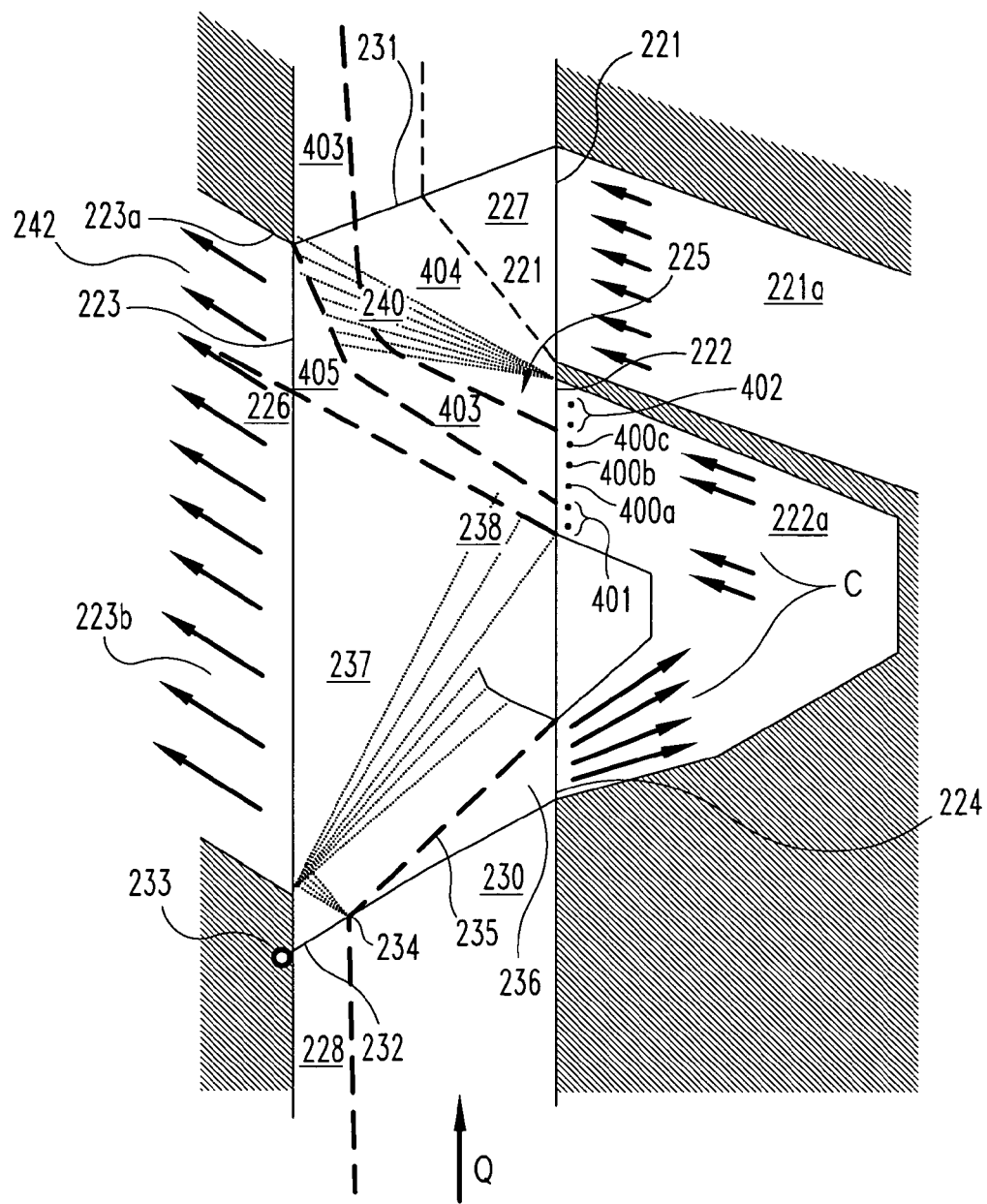
FIG. 12 is a space-time (wave) diagram for an alternate embodiment of a pulsed detonation engine wave rotor wherein the fuel distribution entering the wave rotor inlet port is non-uniform across the port.

With reference to FIG. 12, there is illustrated a space-time (wave) diagram for an alternate embodiment of a pulsed detonation engine wave rotor. The pulsed detonation engine wave rotor is similar to the pulsed detonation engine wave rotor described with the assistance of FIG. 8. However, the pulsed detonation engine wave rotor described with the assistance of FIG. 12 has the fuel distribution changed within the region prior to high pressure energy transfer gas inlet port 222. The changing of the fueling at the region just prior to the high pressure energy transfer gas inlet port 222 is utilized to adjust the exit temperature of the fluid from the pulsed detonation engine wave rotor. The fuel adjustment can be used to tailor the fluid exit temperature to materials utilized in the turbine downstream from the outlet and/or to alter the quantity of power output delivered by operation of the device by altering the exit temperature. A plurality of fuel delivery devices 400 is located across the duct 222*a* prior to the high pressure energy transfer gas inlet port 222. In one form the fuel delivery devices 400 are active elements that can be controlled to selectively delivery fuel into the duct 222*a*. In the embodiment illustrated in FIG. 12, the fuel delivery devices 400*a,* 400*b* and 400*c* are delivering fuel and the remaining fuel delivery devices are not activated to deliver fuel. The quantity and location of the fuel delivery devices in FIG. 12 is not intended to be limiting and other quantities and locations are contemplated herein. The fuel may be delivered in a liquid or gaseous form.

In one form of the present invention, a leading first unfueled portion 401 of the high pressure energy transfer gas inlet port 222 is left unfueled. The leading first unfueled portion 401 is within a range of about two to about seventy-five percent of the inlet port 222, and in a preferred form is about 15 percent of the inlet port 222 and the rest of the port is fueled. In another form of the present invention, a second last unfueled portion 402 of the high pressure energy transfer gas inlet port 222 is left unfueled and the rest of the port 222 is fueled. The second unfueled portion is within a range of about two to about fifty percent and the rest of the port is fueled, and in a preferred from the second unfueled portion is about 10percent and the rest of the port is unfueled. A preferred form of the present application includes a first unfueled portion 401 and a second unfueled portion 402, and preferably the first unfueled portion is about 15 percent and the second unfueled portion is about 10 percent. However, other percentages for the unfueled portions are contemplated herein.

The pulsed detonation engine wave rotor described with the assistance of FIG. 12 has the high pressure energy transfer gas outlet port 224, the high pressure energy transfer gas inlet port 222 and the from-compressor inlet port 221 on the same end of the device; and the to-turbine outlet port 223 located on the opposite end of the device. In one form of the present invention there is defined a two port wave rotor cycle including one fluid flow inlet port and one fluid flow outlet port and having a high pressure buffer gas recirculation loop that may be considered internal to the wave rotor device. The high pressure energy transfer inlet port 222 is prior to and adjacent the from-compressor inlet port 221. It can be observed that upon the rotation of rotor 40 each of the plurality of passageways 41 are sequentially brought in registration with the inlet ports 221 and 222 and the outlet ports 223 and 224, and the path of a typical charge of fluid is along the respective passageways 41. The wave diagram for the purpose of description may be started at any point, however, for convenience, the description is started at 227 wherein the low-pressure working fluid is admitted from the compressor. The concept of low pressure should not be understood in absolute manner, it is only low in comparison with the rest of the pressure level of gas within the pulsed detonation engine wave rotor.

The low pressure portion 227 of the wave rotor engine receives a supply of low-pressure working fluid from compressor 21. The working fluid enters passageways 41 upon the from-compressor inlet port 221 being aligned with the respective passageways 41. Fuel is introduced into the region 403 by the fuel delivery devices 400*a,* 400*b* and 400*c*. The region 403 is a fueled region and the regions 404 and 405 are non-fueled regions with a non-vitiated working fluid. A portion of the region 403 exists at the end of the rotor and this region has a fuel content such that the mixture of fuel and working fluid is combustible.

A detonation is initiated from an end portion of the wave rotor 40 adjacent the region 228 and a detonation wave 232 travels through the fuel-working-fluid air mixture within the region 403 toward the opposite end of the rotor containing a working-fluid-without-fuel region 230. In one form of the present invention, a detonation initiator 233 initiates the detonation; such as but not limited to a high energy spark discharge device. However, in an alternate form of the present invention the detonation is initiated by an auto-detonation process and does not include a detonation initiator. The detonation wave 232 travels along the length of the passageway and ceases with the absence of fuel at the gas interface 234. Thereafter, a pressure wave 235 travels into the working-fluid-without-fuel region 230 of the passageway and compresses this working fluid to define a high-pressure buffer/energy transfer gas within region 236. The concept of high pressure should not be understood in an absolute manner, it is only high in comparison with the rest of the pressure level of gas within the pulsed detonation engine wave rotor.

The high pressure buffer/energy transfer gas within region 236 exits the wave rotor device 220 through the buffer gas outlet port 224. The combusted gases within the region 237 exits the wave rotor through the to-turbine outlet port 223. Expansion of the combusted gas prior to entering the turbine results in a lower turbine inlet temperature without reducing the effective peak cycle temperature. As the combusted gas exits the outlet port 223, the expansion process continues within the passageways 41 of the rotor and travels toward the opposite end of the passageway. As the expansion arrives at the end of the passage, the pressure of the gas within the region 238 at the end of the rotor opposite the to-turbine outlet port 223 declines. The wave rotor inlet port 222 opens and allows the flow of the high pressure buffer/energy transfer working fluid into the rotor at region 225 and causes the recompression of a portion of the combusted gases within the rotor. The admission of gas via port 222 can be accomplished by a shock wave. The flow of the high pressure buffer gas adds energy to the exhaust process of the combustion gas and allows the expansion of the combusted gas to be accomplished in a controlled, uniform energy process in one form of the invention. Thus, in one form the introduction of the high pressure buffer/energy transfer gas is adapted to maintain the high velocity flow of combusted gases exiting the wave rotor until substantially all of the combusted gas within the rotor is exhausted.

In one embodiment, the wave rotor inlet port 222, which allows the introduction of the high pressure buffer/energy transfer gas, closes before the to-turbine outlet port 223 is closed. The closing of the wave rotor inlet port 222 causes an expansion process to occur within the high pressure buffer/energy transfer air within region 240 and lowers the pressure of the gas and creates a region 404. This expansion process occurs within the buffer/energy transfer gas and allows this gas to preferentially remain within the rotor at the lowest pressure region of the rotor. The to-turbine outlet port 223 is closed as the expansion in region 240 reaches the exit end of the passageway. As illustrated in region 242, the portion of the high pressure buffer/energy transfer gas in region 405 exits through the outlet port 223. This exiting buffer/energy transfer gas functions to insulate the duct wall 223*a* from the hot combusted gas within region 226 of the duct 223*b*. The pressure in region 404 has been lowered and the from-compressor inlet port 221 allows pre-compressed low pressure working fluid to enter the rotor passageways in the region 227 having the lowered pressure. The entering motion of the pre-compressed low-pressure working fluid through port 221 is stopped by the arrival of pressure wave 231 originating from the exit end of the rotor and traveling toward the inlet end. The pressure wave 231 originated from the closure of the to-turbine outlet port 223. The design and construction of the wave rotor is such that the arrival of the pressure wave 231 corresponds with the closing of the from-compressor inlet port 221.

Figure 13:
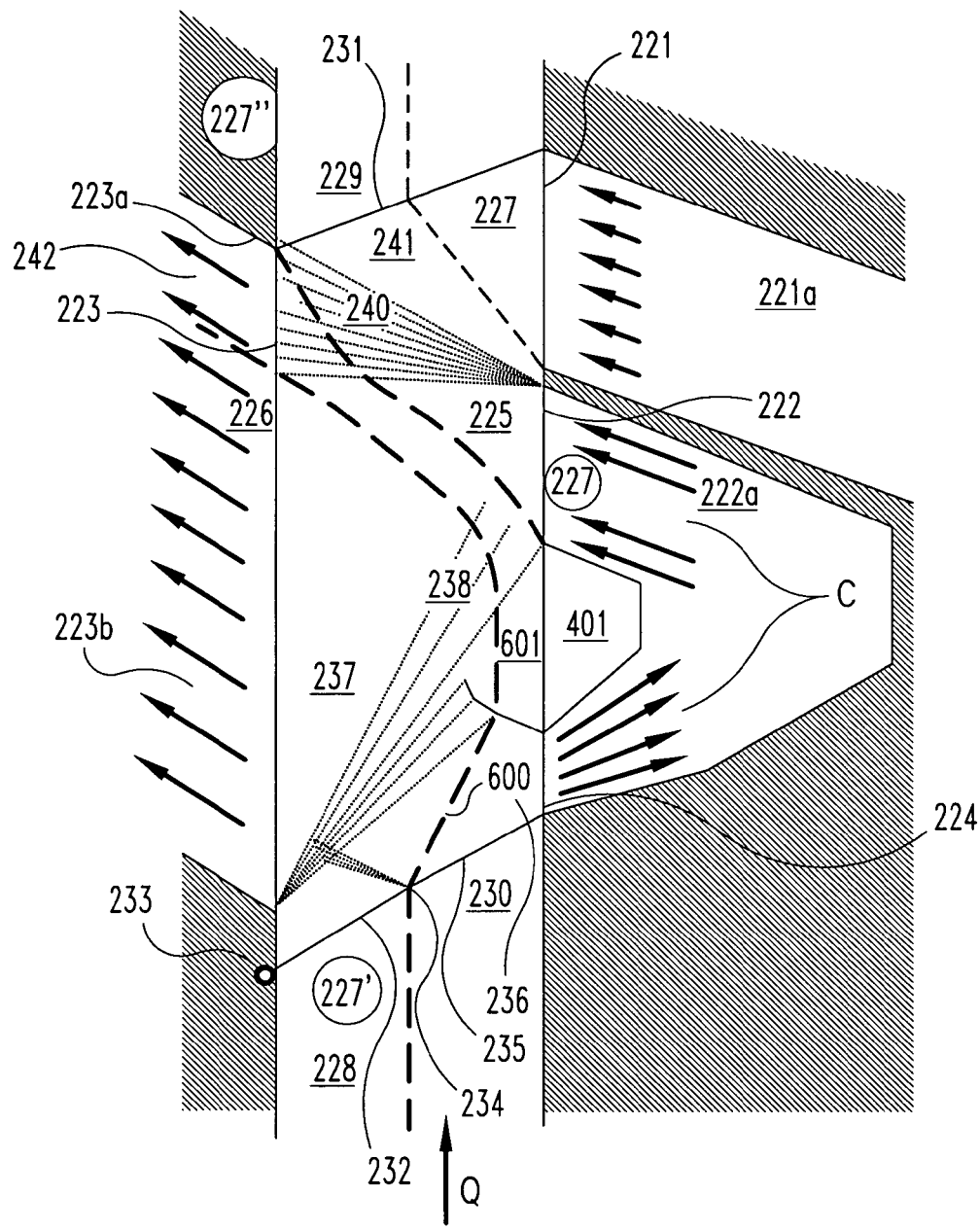
FIG. 13 is a space-time (wave) diagram for an alternate embodiment of a pulsed detonation engine wave rotor wherein a quantity of working fluid without fuel is parked within the passageway to facilitate mass flow balancing.

With reference to FIG. 13, there is illustrated a space-time (wave) diagram for a pulsed detonation engine wave rotor that utilizes a cycle that is substantially similar to the cycle set forth in FIG. 8. However, the pulsed detonation engine wave rotor described with the assistance of FIG. 13 has the location of the gas interface 600 in a different location to facilitate mass flow balancing within the system. The mass flow balancing is accommodated by parking a quantity of the high-pressure buffer/energy transfer gas from region 236 in region 601. The energy of compression imparted previously to the gas of region 601 by compression wave 235 is released to the flow of gas moving to exhaust port 226 by the arrival of expansion wave 238 and acts to expel it to the exhaust port in an energetic manner. The parked gas in region 601, being non-vitiated and does not gain fuel. This gas 601 thus separates the vitiated combustion gas of elevated temperature from the stationary end wall 401 hence avoiding heating of wall 401. Similarly, the gas of region 601 separates the vitiated combustion gas of region 237 and the gas with fuel added entering from port 222. Gas in region 601 moves to pass into region 242 and thereby insulates surface 223*a* from the combustion gas of region 226. The pulsed detonation engine wave rotor described with the assistance of FIG. 13 has the high pressure energy transfer gas outlet port 224, the high pressure energy transfer gas inlet port 222 and the from-compressor inlet port 221 on the same end of the device; and the to-turbine outlet port 223 located on the opposite end of the device. In one form of the present invention there is defined a two port wave rotor cycle including one fluid flow inlet port and one fluid flow outlet port and having a high pressure buffer gas recirculation loop that may be considered internal to the wave rotor device. The high pressure energy transfer inlet port 222 is prior to and adjacent the from-compressor inlet port 221. It can be observed that upon the rotation of rotor 40 each of the plurality of passageways 41 are sequentially brought in registration with the inlet ports 221 and 222 and the outlet ports 223 and 224, and the path of a typical charge of fluid is along the respective passageways 41. The wave diagram for the purpose of description may be started at any point, however, for convenience, the description is started at 227 wherein the low-pressure working fluid is admitted from the compressor. The concept of low pressure should not be understood in absolute manner, it is only low in comparison with the rest of the pressure level of gas within the pulsed detonation engine wave rotor.

The low pressure portion 227 of the wave rotor engine receives a supply of low-pressure working fluid from compressor 21. The working fluid enters passageways 41 upon the from-compressor inlet port 221 being aligned with the respective passageways 41. In one embodiment fuel is introduced into the region 225 by: stationery continuously operated spray nozzles (liquid) 227 or supply tubes (gas) 227 located within the duct 222*a* leading to the high pressure energy transfer gas inlet port 222; or, into region 228 by intermittently actuated spray nozzles (liquid) 227' or supply tubes (gas) 227' located within the rotor; or, into region 228 by spray nozzles (liquid) 227" or supply tubes (gas) 227" located within the rotor end plate 226. Region 228 exists at the end of the rotor and the region has a fuel content such that the mixture of fuel and working fluid is combustible.

A detonation is initiated from an end portion of the wave rotor 40 adjacent the region 228 and a detonation wave 232 travels through the fuel-working-fluid air mixture within the region 228 toward the opposite end of the rotor containing a working-fluid-without-fuel region 230. In one form of the present invention, a detonation initiator 233 initiates the detonation; such as but not limited to a high energy spark discharge device. However, in an alternate form of the present invention the detonation is initiated by an auto-detonation process and does not include a detonation initiator. The detonation wave 232 travels along the length of the passageway and ceases with the absence of fuel at the gas interface 234. Thereafter, a pressure wave 235 travels into the working-fluid-without-fuel region 230 of the passageway and compresses this working fluid to define a high-pressure buffer/energy transfer gas within region 236. The concept of high pressure should not be understood in an absolute manner, it is only high in comparison with the rest of the pressure level of gas within the pulsed detonation engine wave rotor.

A portion of the high pressure buffer/energy transfer gas within region 236 exits the wave rotor device 220 through the buffer gas outlet port 224 and a portion is maintained within the wave rotor device 220 in region 601. As discussed previously, the energy of the compression imparted previously to the gas of region 601 by compression wave 235 is released to the flow of gas moving to exhaust port 236 by the arrival of expansion wave 238 and acts to expel it to the exhaust port. This parked gas within the region 601 separates the vitiated combusted gas of elevated temperatures from the end wall 401. Similarly, the gas within region 601 separates the vitiated combustion gas of region 237 and the gas with fuel added entering from port 222. The gas within region 601 passes into region 245 and insulates surface 233*a* from the combustor gas within region 226

The combusted gases within the region 237 exits the wave rotor through the to-turbine outlet port 223. Expansion of the combusted gas prior to entering the turbine results in a lower turbine inlet temperature without reducing the effective peak cycle temperature. As the combusted gas exits the outlet port 223, the expansion process continues within the passageways 41 of the rotor and travels toward the opposite end of the passageway. As the expansion arrives at the end of the passage, the pressure of the gas within the region 238 at the end of the rotor opposite the to-turbine outlet port 223 declines. The wave rotor inlet port 222 opens and allows the flow of the high pressure buffer/energy transfer working fluid into the rotor at region 225 and causes the recompression of a portion of the combusted gases and the gas from region 601 within the rotor. The admission of gas via port 222 can be accomplished by a shock wave. The flow of the high pressure buffer gas adds energy to the exhaust process of the combustion gas and allows the expansion of the combusted gas to be accomplished in a controlled, uniform energy process in one form of the invention. Thus, in one form the introduction of the high pressure buffer/energy transfer gas is adapted to maintain the high velocity flow of combusted gases exiting the wave rotor until substantially all of the combusted gas within the rotor is exhausted.

In one embodiment, the wave rotor inlet port 222, which allows the introduction of the high pressure buffer/energy transfer gas, closes before the to-turbine outlet port 223 is closed. The closing of the wave rotor inlet port 222 causes an expansion process to occur within the high pressure buffer/energy transfer air within region 240 and lowers the pressure of the gas and creates a region 240. This expansion process occurs within the buffer/energy transfer gas and allows this gas to preferentially remain within the rotor at the lowest pressure region of the rotor. The to-turbine outlet port 223 is closed as the expansion in region 240 reaches the exit end of the passageway. In one form of the present invention as illustrated in region 242, a portion of the high pressure buffer/energy transfer gas exits through the outlet port 223. This exiting buffer/energy transfer gas functions to insulate the duct wall 223a from the hot combusted gas within region 226 of the duct 223b. The pressure in region 241 has been lowered and the from-compressor inlet port 221 allows pre-compressed low pressure working fluid to enter the rotor passageways in the region 227 having the lowered pressure. The entering motion of the pre-compressed low-pressure working fluid through port 221 is stopped by the arrival of pressure wave 231 originating from the exit end of the rotor and traveling toward the inlet end. The pressure wave 231 originated from the closure of the to-turbine outlet port 223. The design and construction of the wave rotor is such that the arrival of the pressure wave 231 corresponds with the closing of the from-compressor inlet port 221.

Figure 14:
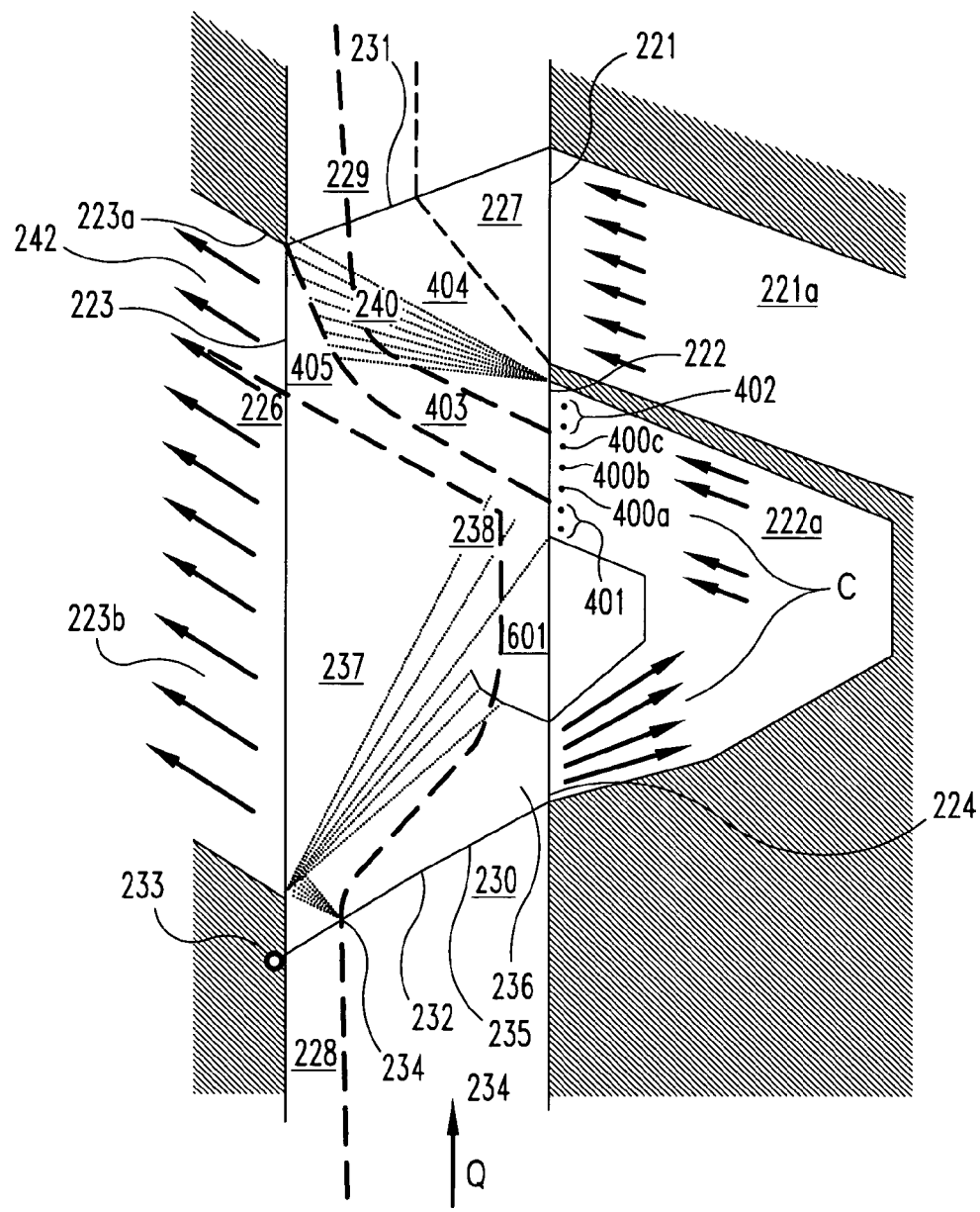
FIG. 14 is a space-time (wave) diagram for an alternate embodiment of a pulsed detonation engine wave rotor wherein the fuel distribution entering the wave rotor inlet port is non-uniform across the port and a quantity of the working fluid without fuel is parked within the passageway to facilitate mass flow balancing.

With reference to FIG. 14, there is illustrated a space-time (wave) diagram for an alternate embodiment of a pulsed detonation engine wave rotor. The pulsed detonation engine wave rotor cycle includes the fuel distribution system of FIG. 12 and the mass flow balancing of FIG. 13 that is accommodated by parking a quantity of the high-pressure buffer/energy transfer gas from region 236 in region 601. The combination of the two embodiments results in the embodiment of FIG. 15 operating within a select range of exhaust port 223 gas temperatures generally higher or lower than that of the other embodiments depending on fuel heat capacity and limits on fuel to air combustability ratios. The fueled portion of the gas in region 403 is made to arrive at the exit end of a passage at the end of port 223 an hence bring fueled gas into region 228.

Figure 15:
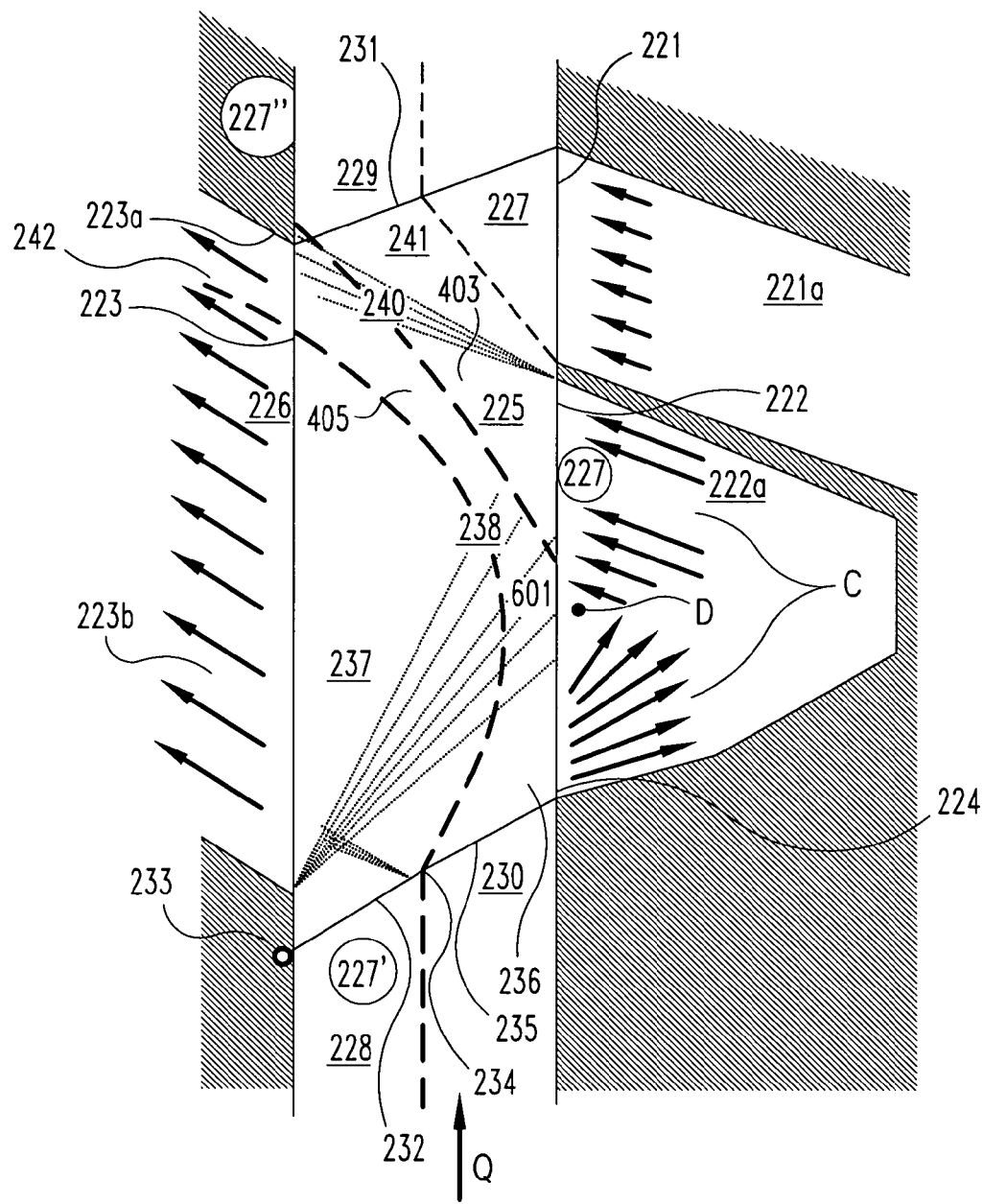
FIG. 15 is a space-time (wave) diagram for an alternate embodiment of a pulsed detonation engine wave rotor wherein the wave rotor high pressure energy transfer gas and buffer gas outlet port and gas re-entry and inlet port are adjacent and not separated by a mechanical divider.
Figure 16:
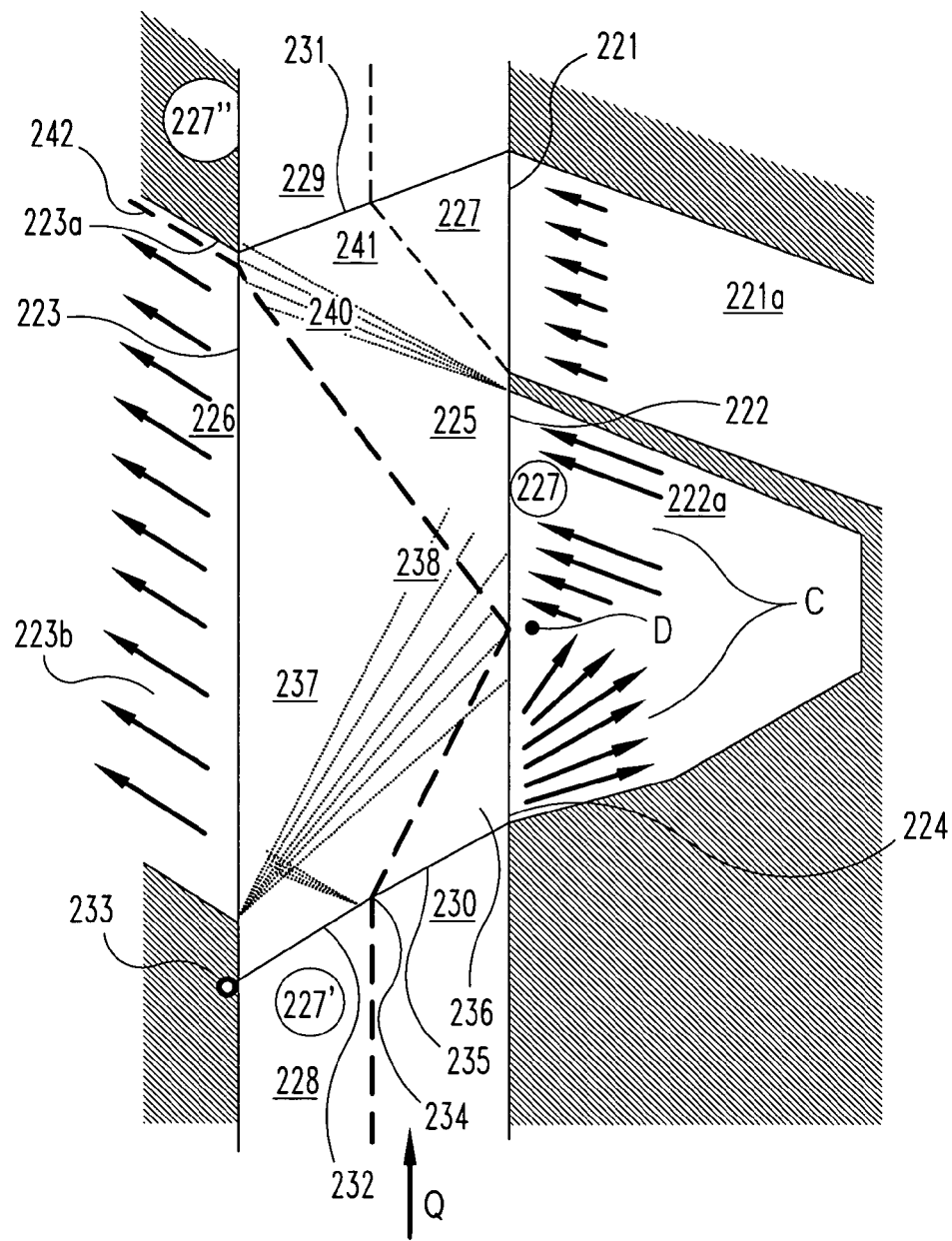
FIG. 16 is a space-time (wave) diagram for an another alternate embodiment of a pulsed detonation engine wave rotor wherein the wave rotor high pressure energy transfer gas and buffer gas outlet port and gas re-entry and inlet port are adjacent and not separated by a mechanical divider.

With reference to FIGS. 15 and 16 there are illustrated space-time (wave) diagrams for alternative embodiments of pulsed detonation engine wave rotors. Each of the respective systems includes a high pressure energy transfer gas inlet port 222 and a high pressure energy transfer gas outlet port 224 that are not separated by a mechanical divider. It should be understood herein that the embodiments are applicable broadly to the systems and aspects disclosed within this application. The high pressure inflow and outflow occurring adjacent one another in two ports that are not separated by a mechanical divider. Referring to FIG. 15, there is illustrated the compressed gas of region 236 flowing into port 224. As any passageway of the rotor 40 proceeds due to rotation in direction Q, the arrival of expansion waves 238 slows the gas entry into port 224. There exists at some point D, a condition at which the gas entry into port 224 ceases due to an equilibrium of pressures in region 236 and port 224. At point D, port 224 is essentially closed due to gas action rather than the presence of a physical wall 401 as in the embodiment of FIG. 14. As rotation of rotor 40 continues and arrival of expansion wave 238 continues to reduce the pressure, region 225 is reached where gas issues from port 222a. Fuel is admitted utilizing the identical method of 227 as described embodiment with reference to FIG. 8.

Referring to FIG. 16, there is illustrated an embodiment of the present invention in which, for reasons of gas mass balance, the combustion gas of region 237 reach or very nearly reach point D as described with the assistance of the embodiment of FIG. 15. The relative positioning of the interface between regions 236 and 237 and the interface between regions 225 and 237 in the embodiments of FIGS. 15 and 16 respectively is in the existence of a parked gas region 601 in FIG. 15. This unfueled portion of gas results in the layer of relatively cool gas of region 405 which proceeds to exit port 223. This gas within region 405 functions in the same manner described in the embodiment of FIG. 14.

Figure 17:
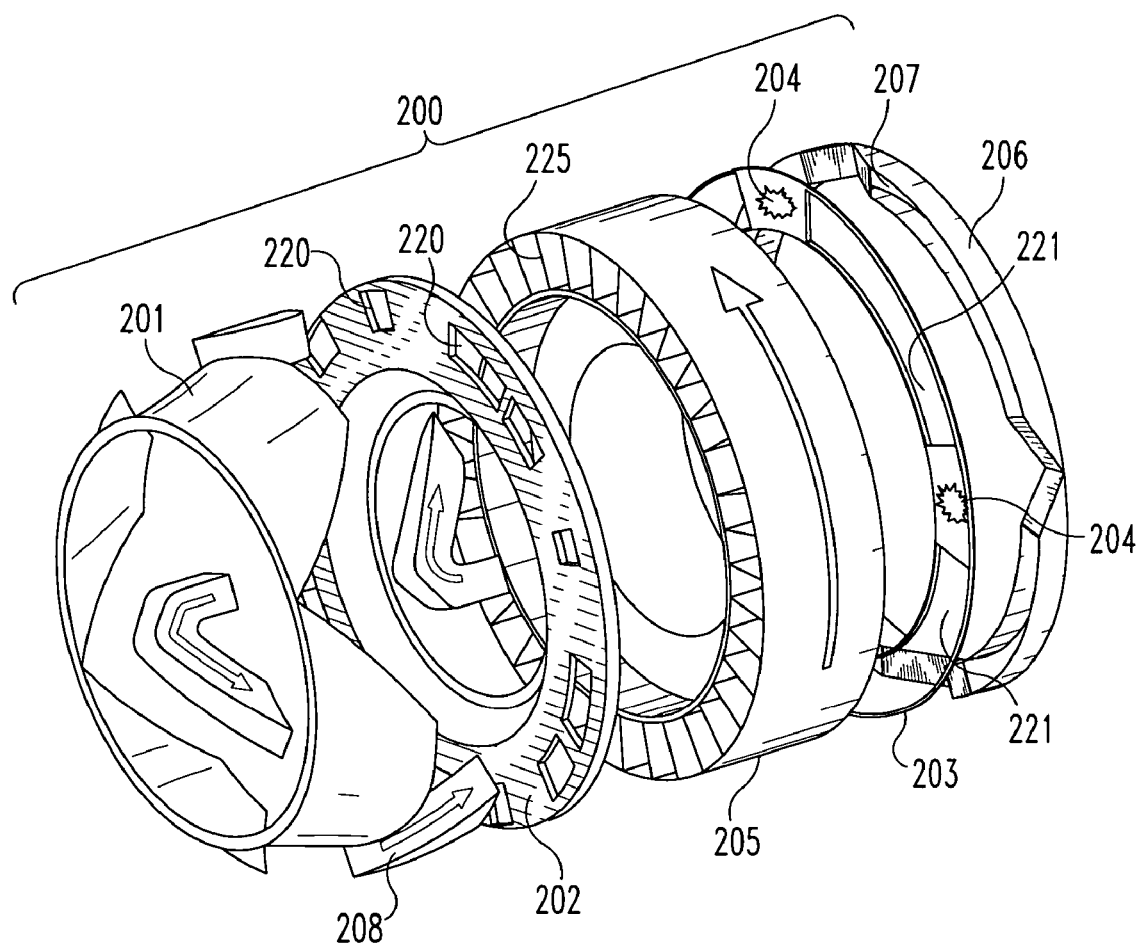
FIG. 17 is a partially exploded illustrative view of one embodiment of a constant volume combustor comprising one form of the present invention.

With reference to FIG. 17, there is illustrated an exploded view of one embodiment of the constant volume combustor 200. Constant volume combustor 200 includes a transition duct 201 for providing fluid communication pathway with the compressor and/or other inlet of the engine. The constant volume combustor 200 further includes an endplate 202 with a plurality of ports 220, and an endplate 203 with a plurality of exit ports 221 and detonation initiation devices 204. Fluid passes through the plurality of exit ports 221 into a transition duct 206 including fluid flow passageways passages 207. Further, the constant volume combustor 200 includes a plurality of buffer ducts 208 that deliver the buffer air to different locations within the rotor 205. The reader should appreciate that the delivery of air through the buffer ducts 208 is in the direction of rotation. Each of the buffer ducts 208 may includes a fuel delivery mechanism. The constant volume combustor has been described with the aid of FIG. 17, however the present application contemplates other constant volume combustors capable of utilizing the cycles described previously in this application. In a preferred form, the constant volume combustor 200 has detonative combustion occurring therein.

Figure 18:
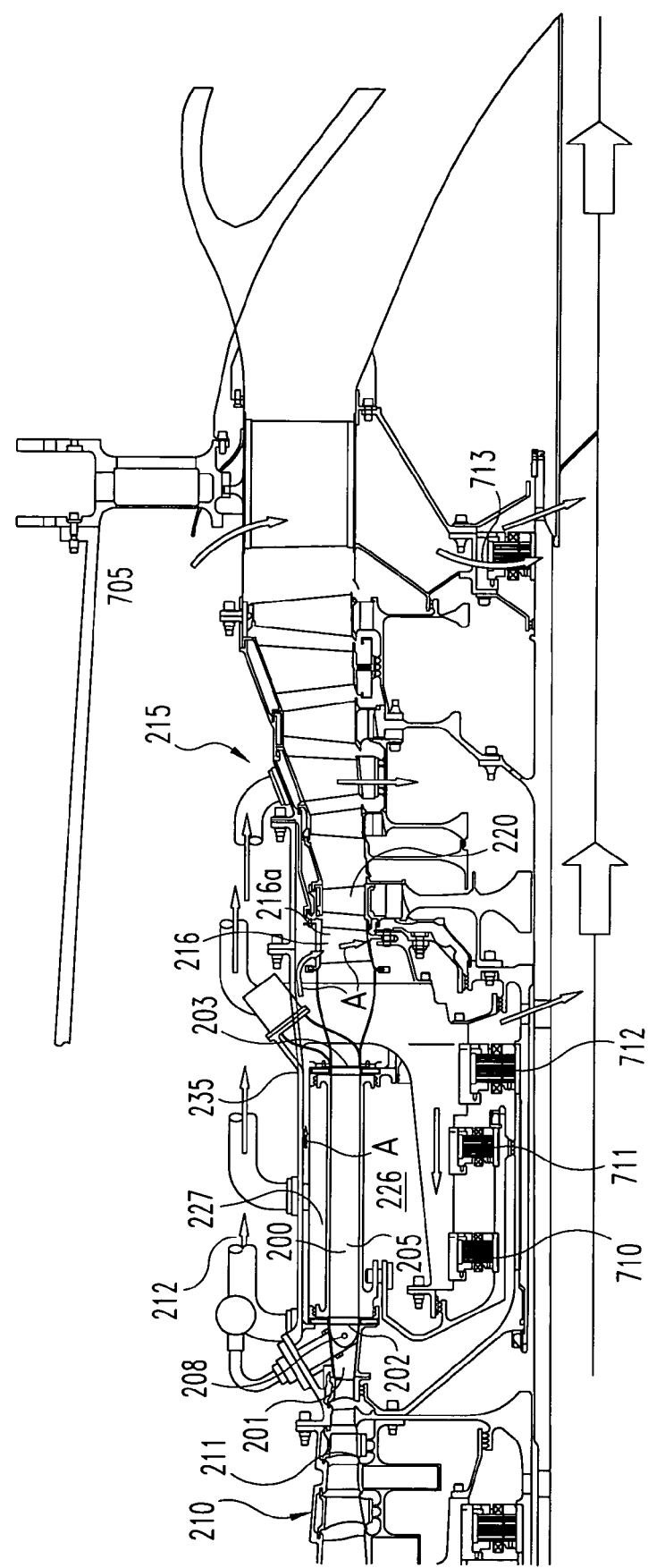
FIG. 18 is an illustrative sectional view of a gas turbine engine including a constant volume combustor comprising one form of the present invention.

With reference to FIG. 18, there is illustrated a cross-sectional view of a gas turbine engine with the constant volume combustor 200 integrated therein. The term gas turbine engine is intended to be interpreted broadly and the present inventions are contemplated for utilization with virtually all typical forms of gas turbine engines unless specifically provided to the contrary. The constant volume combustor 200 receives a working fluid from the primary flowpath of the compressor section 210 through transition duct 201. In one form of the present invention the working fluid discharged from the compressor has a temperature of about 1212° F., however other working fluid temperatures are contemplated herein. The working fluid is delivered to the constant volume combustor 200 and a first portion of the working fluid is utilized in the ensuing combustion within the wave rotor passages 225. A second portion of the working fluid is extracted through port 212 and is utilized as cooling fluid for the low pressure turbine airfoils and to provide secondary cooling airflow to the low pressure turbine seals.

The constant volume combustor 200 raises the pressure of working fluid from the primary flowpath 211 above the pressure from the compressor discharge and therefore the compressor discharge working fluid is too low in pressure to be utilized for high pressure turbine cooling. In one form of the present invention, the constant volume combustor 200 raises the pressure of the working fluid from the primary flowpath 211 about 20%. The present invention contemplates pressure rises within the range of about 10% to about 50%; however, other pressure rises are contemplated herein. The turbine section 215 includes a first stage nozzle 216a having a plurality of nozzle guide vanes 216. In one form of the present invention the nozzle guide vanes 216 are transpiration cooled, therefore the cooling media delivered to the respective nozzle guide vanes 216 must be at a pressure higher than the working fluid flow exiting the constant volume combustor 200. In one form of the present invention in order to provide cooling media to the plurality of guide vanes 216, some of the working fluid from the constant volume combustor return ducts 208 is bled off, and ducted around the constant volume combustor to the nozzle guide vane 216. In one form the working fluid flows through a passageway defined between the constant volume combustor rotor 205 and the outer combustor case 235. The working fluid follows the flowpath as indicated by arrows A to cool the guide vanes 216. The working fluid bled from the constant volume combustor return duct is relatively high in pressure and above the pressure of the discharged working fluid from the constant volume combustor discharge; making it an excellent source for cooling fluid. A portion of the working fluid from the constant volume combustor return duct passes directly through the first stage nozzle 216a and is used to cool blades 220 of the high pressure turbine. However, the present application is applicable to propulsion systems having nozzle guide vanes that are not actively cooled.

In one form of the present invention the constant volume combustor 200 is located within the combustor case 235 and has an inner vent cavity 226 and an outer vent cavity 227 adjacent thereto. These cavities form a relatively lower pressure sink to enable one form of the constant volume combustor endplates 202 and 203 to function. In one embodiment of the present invention, each of the endplates 202 and 203 float hydrostatically on a cushion of working fluid and are located a small distance from the rotating face of the rotor 205. In one form of the present invention the small distance is within a range of about 0.0005 inches to about 0.0015 inches. With reference to FIGS. 18a–b, there is schematically illustrated the operation of the sealing plates 202 and 203. FIG. 18a represents a circumferential view at the ports 220. FIG. 18b represents a circumferential view between the ports 220. The sealing plate illustrated is the forward sealing plate and has a face 700 that sees the pressure from the constant volume combustor rotor passage 200 and the vent cavity 226. A quantity of the high pressure working fluid 208a bled from the constant volume combustor return duct 208 is supplied into the sealing plate and is discharged through a plurality of ports 701 into the gap adjacent the rotating rotor end. The discharged working fluid from the plurality of ports 701 allows the seal plate to float hydrostatically on a thin film of working fluid and remain a finite small gap from the end of the rotating rotor. The aft seal plate is free to move axially in a stationary structure in order to seek it own location. At the other end of the rotor there is located a substantially similar seal plate that functions in substantially the same fashion as the aft sealing plate. However, in a preferred form of the present application, this seal plate is fixed to the outer combustor case.

With reference to FIG. 18c, there is schematically illustrated various features of the sealing plate 202 and by extension the plate 203. The sealing plate illustrated is the forward sealing plate in very close proximity to the rotor 205. A quantity of the high pressure working fluid 208a bled from the constant volume combustor return duct 208 is supplied into the sealing plate and is discharged through the aforementioned ports 701 not shown here, into the very small spacing between the seal plate 202 and the adjacent rotating rotor end. The discharged working fluid 208a from duct 208 allows the seal plate to float hydrostatically on a thin film of working fluid and remain at high pressure in the finite small space. In this embodiment, confinement of this high pressure gas is enhanced by the presence of labyrinth knife seal of design knowledgeable by one schooled in this art placed at the inner and outer diameter of the rotor. Also in this embodiment, the seal plate is confined in its axial movement relative to the stationary structure 201 by "C" seal and spring 500 in order to balance the forces on the seal plate 202 and prevent bleed air 208a from duct 208 from entering unrestrained into port 220. An anti-rotation pin 505 is fixed to 201 and mated to a slot in plate 202 to avoid rotation of plate 202. Similarly in this embodiment at the other end of the rotor there is located a substantially similar seal plate that functions in substantially the same fashion as the forward sealing plate.

Figure 19:
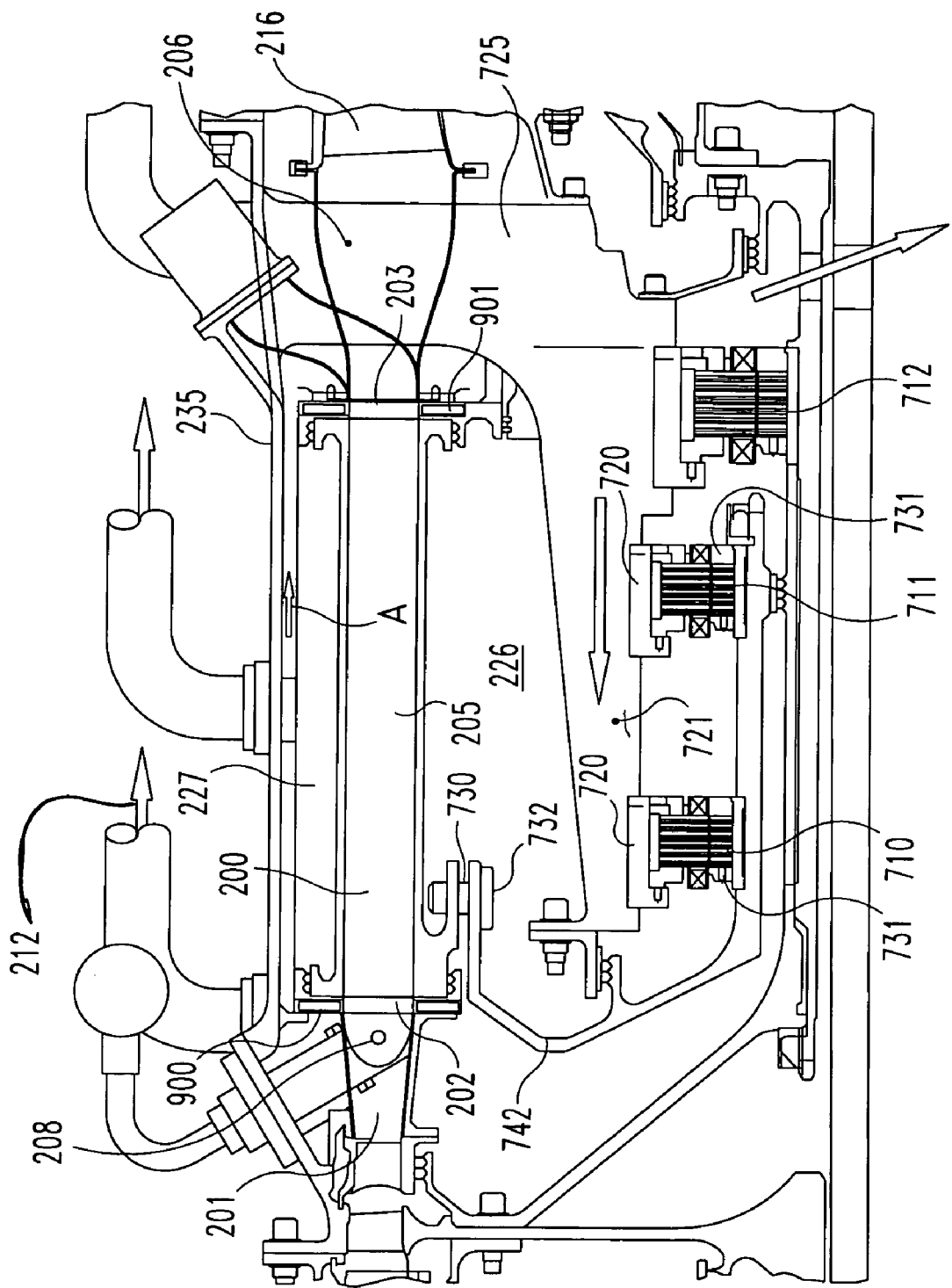
FIG. 19 is an enlarged view of the constant volume combustor of FIG. 18.

A fan duct 705 has a quantity of fan duct working fluid flowing therethrough. A portion of the fan duct flow is bled off and used to cool selected components within the engine. In one form the fan duct flow is utilized to cool magnetic bearings located within the engine. Feature numbers 710, 711, 712 and 713 sets forth examples of the magnetic bearings. In one embodiment of the present invention the constant volume combustor rotor 205 is supported by and rotates on radial magnetic bearings 710 and 711. With reference to FIG. 19, the radial magnetic bearings 710 and 711 each have a stator portion 720 coupled to a member 721 that is connected to the mechanical housing 725 and a rotor portion 731 that is coupled with an attachment structure 742 of the constant volume combustor rotor 205. In a preferred form the magnetic bearings 710 and 711 are active electromagnetic bearings that are controlled by a controller. In one form of the present invention there is a significant thermal gradient between the constant volume combustor rotor 205 and the magnetic bearings 720. Presently, magnetic bearings are generally limited to applications having environmental temperatures of up to about 800° F. In one form, the present invention substantially isolates in a thermal sense the magnetic bearing from the rotor 205. More specifically, a thermal conduction limiting structure is utilized to couple the constant volume combustor rotor 205 with the magnetic bearings.

Figure 20:
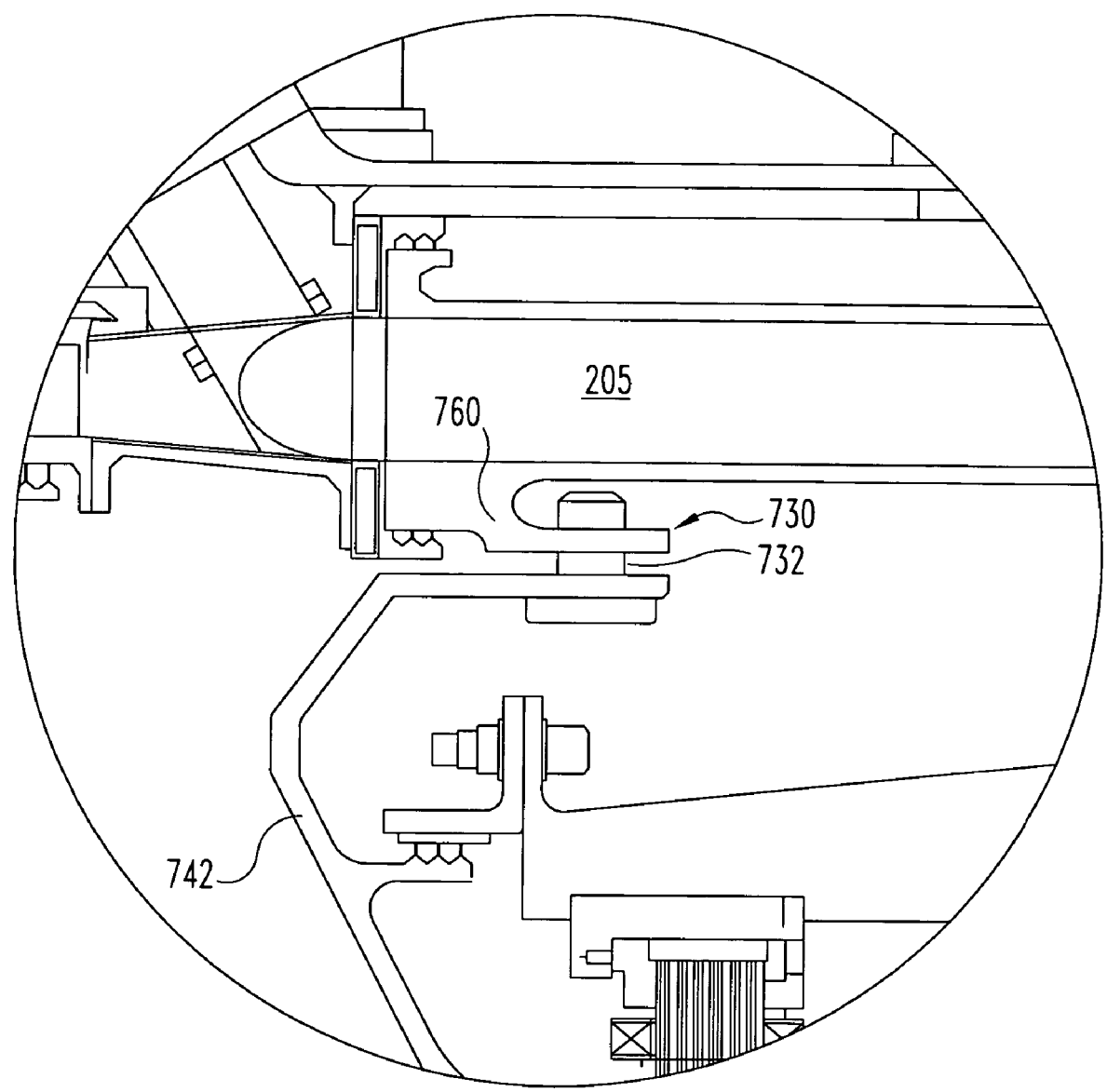
FIG. 20 is an enlarged view of a radial mount comprising a portion of the constant volume combustor of FIG. 19.

With reference to FIG. 20, there is illustrated one form of the thermal conduction limiting structure including a pin joint 730 of the plurality of pin joints coupling the rotor 205 with the supporting structure 731. The pin joint 730 includes a radial pin 732 mechanically connecting the structure 760 of the rotor 205 with the supporting structure 742 and the pin joint limiting the conductive heat transfer path between the wave rotor 205 and the supporting structure 731. The limited conductive heat transfer path associated with the radial pin 732 is due to the reduced flowpath for energy by conduction and is one means to thermally isolate the rotor 205 from the radial magnetic bearings. The present application further contemplates a system utilizing other forms of bearings and other coupling structures for the bearings, whether the bearings are magnetic bearings or some other type of bearing also needing thermal isolation as known to one of skill in the art.

The constant volume combustor rotor 205 could be designed as a free wheeling structure or one that is driven during at least portions of its operating cycle. One embodiment of the present invention contemplates the utilization of the radial magnetic bearings and a conventional electrically driven starter motor located with the magnetic bearings 720 supporting the rotor, said motor functioning to cause rotation of the rotor. Further, the present invention contemplates conventional means to drive the rotor 205 during start up or at other engine operating conditio ns. One system contemplates a conventional starter operatively coupled to the rotor 205 to provide the initial rotation necessary to start the constant volume combustor.

The present application contemplates that, in the starting of the engine including the constant volume combustor, the constant volume combustor would be started before the rest of the machine and hence act to start the rest of the machine. The rotor 205 of the constant volume combustor would be brought up to a predetermined speed and fuel added and upon ignition the constant volume combustor would discharge working fluid that impinges on the high pressure turbine which starts the high pressure turbine rotor, the output of which then starts the low pressure rotor spinning. The spinning high pressure and low pressure turbines would continue as the rest of the machine is started. Further, in another embodiment the constant volume combustor includes a starter and a generator. The starter and generator are controllable to provide the ability to modify the rotational speed of the constant volume combustor rotor. The starter could be engaged to increase the speed and add energy during desired operating parameters, while the generator could be engaged to decrease the speed and extract energy during desired operating parameters.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary and embodiments lacking the same may be contemplated as within the scope of the invention, that scope being defined only by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A pressure wave apparatus, comprising:
    a rotatable rotor having a plurality of passageways therethrough, said rotor having a direction of rotation;
    pair of exit ports disposed in fluid communication with said rotor and adapted to receive fluid exiting from said plurality of passageways, one of said pair of exit ports is a combusted gas exit port for passing a substantially combusted gas from said plurality of passageways and the other of said pair of exit ports is a buffer gas exit port for passing a buffer gas from said plurality of passageways;
    a pair of inlet ports disposed in fluid communication with said rotor and adapted to introduce fluid to said plurality of passageways, one of said pair of inlet ports is a working fluid inlet port for passing a working fluid into said plurality of passageways and the other of said pair of inlet ports is a buffer gas inlet port for receiving the buffer gas from said buffer gas exit port and passing the buffer gas into said plurality of passageways, said buffer gas exit port is adjacent to and sequentially prior to said buffer gas inlet port; and
    a fuel deliverer adapted to deliver a fuel within said buffer gas inlet port adjacent the rotatable rotor, wherein said fuel deliverer delivers fuel into a first portion of said buffer gas inlet port and not into a second portion of said buffer gas inlet port.

2. The pressure wave apparatus of claim 1, wherein said second portion includes a leading portion of said buffer gas inlet port.

3. The pressure wave apparatus of claim 2, wherein said leading portion is the initial about fifteen percent of said buffer gas inlet port.

4. The pressure wave apparatus of claim 1, wherein said second portion includes a leading portion of said buffer gas inlet port and a last portion of said buffer gas inlet port.

5. The pressure wave apparatus of claim 4, wherein said leading portion is defined by the initial about fifteen percent of said buffer gas inlet port and said last portion is defined by the last about ten percent of said buffer gas inlet port.

6. The pressure wave apparatus of claim 1, wherein said fuel deliverer includes a plurality of fuel delivery devices spaced across said buffer gas inlet port, and wherein at least a portion of said plurality of fuel delivery devices are controllable to selectively deliver fuel.

7. The pressure wave apparatus of claim 1, which further includes a passageway between said buffer gas exit port and said buffer gas inlet port, and wherein said passageway is adapted to deliver the buffer gas from said buffer gas exit port to said buffer gas inlet port in said direction of rotation.

8. The pressure wave apparatus of claim 1, wherein the fuel and the working fluid is detonated within said plurality of passageways.

9. The pressure wave apparatus of claim 1, wherein said second portion is defined by a leading portion of said buffer gas inlet port and a last portion of said buffer gas inlet port; wherein said fuel deliverer includes a plurality of fuel delivery devices spaced across said buffer gas inlet port and adapted to deliver fuel into the buffer gas flowing through said first portion; and wherein the fuel and the working fluid within at least one of said plurality of passageways is detonated.

10. The pressure wave apparatus of claim 9, wherein the buffer gas is formed by compressing a portion of the working fluid within said plurality of passageways; which further includes an igniter disposed in communication with the fuel and working fluid within said at least one of said plurality of passageways, and wherein said igniter being operable to initiate the detonation of the fuel and working fluid within said at least one of said plurality of passageways.

11. The pressure wave apparatus of claim 10, wherein said rotor having a first end and an opposite second end; wherein said buffer gas exit port and said pair of inlet ports are located adjacent said first end, and said combusted gas exit port is located adjacent said second end; and wherein said buffer gas inlet port is adjacent to and sequentially prior to said working fluid inlet port.

12. A method, comprising:
providing a gas turbine engine including a compressor, a constant volume combustor including a wave rotor, and a turbine, the wave rotor including a passageway having a first end and a second end;
rotating the wave rotor;
introducing a quantity of working fluid into the passageway through the first end of the passageway;
delivering a quantity of fuel into the passageway through the first end of the passageway;
detonating the fuel and a portion of the working fluid within the passageway to create a combusted gas;
creating waves within the passageway to compress a portion of the working fluid within the passageway to define a buffer gas;
discharging a first portion of the buffer gas from the passageway through the first end of the passageway and rerouting the first portion of the buffer gas from said discharge back into the passageway through the first end of the passageway;
discharging a portion of the combusted gas from the passageway through the second end of the passageway to the turbine; and
expanding the portion of the combusted gas within the turbine.

* * * * *